(12) United States Patent
Takizawa et al.

(10) Patent No.: US 10,379,216 B2
(45) Date of Patent: Aug. 13, 2019

(54) POSITIONING SYSTEM

(71) Applicant: Murata Manufacturing Co., Ltd., Kyoto (JP)

(72) Inventors: Koichi Takizawa, Kyoto (JP); Yoshiharu Yoshii, Kyoto (JP); Yoshiyuki Tokiwa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 350 days.

(21) Appl. No.: 15/280,023

(22) Filed: Sep. 29, 2016

(65) Prior Publication Data

US 2017/0016985 A1    Jan. 19, 2017

Related U.S. Application Data

(63) Continuation of application No. PCT/JP2015/058256, filed on Mar. 19, 2015.

(30) Foreign Application Priority Data

Mar. 31, 2014 (JP) ................................ 2014-074449

(51) Int. Cl.
    *G01S 13/84* (2006.01)
    *G01S 13/82* (2006.01)
    *G01S 13/02* (2006.01)

(52) U.S. Cl.
    CPC ............ *G01S 13/84* (2013.01); *G01S 13/825* (2013.01); *G01S 2013/0245* (2013.01)

(58) Field of Classification Search
    CPC ........ G01S 13/825; G01S 13/08; G01S 13/36; G01S 13/38; G01S 13/931; G01S 13/32; G01S 7/032

(Continued)

(56) References Cited

U.S. PATENT DOCUMENTS 5,073,780 A * 12/1991 Barley .................... G01S 7/415
                                                          342/192
2005/0270229 A1 * 12/2005 Stephens .................. G01S 3/50
                                                          342/146

(Continued)

FOREIGN PATENT DOCUMENTS

CN          102193081 A         9/2011
JP          H04-9783 A          1/1992

(Continued)

OTHER PUBLICATIONS

International Search Report issued in Japanese Patent Application No. PCT/JP2015/058256 dated Jun. 23, 2015.

(Continued)

*Primary Examiner* — Harry K Liu
(74) *Attorney, Agent, or Firm* — Pearne & Gordon LLP

(57) ABSTRACT

A measurement apparatus outputs from a first antenna pair transmission signals ($St_{11}$) and ($St_{12}$) whose phase difference ($\Delta\phi_1$) changes over time. A target object simultaneously receives the transmission signals ($St_{11}$) and ($St_{12}$) from a target-side antenna and returns to the measurement apparatus information ($D\phi$) according to the positional relationship between the target object and the measurement apparatus determined from a reception signal ($Sr_1$). The measurement apparatus outputs from a second antenna pair transmission signals ($St_{21}$) and ($St_{22}$) whose phase difference ($\Delta\phi_2$) changes over time. The target object simultaneously receives the transmission signals ($St_{21}$) and ($St_{22}$) from the target-side antenna and returns to the measurement apparatus the information ($D\phi$) corresponding to the positional relationship between the target object and the measurement apparatus determined from a reception signal ($Sr_2$). The measurement apparatus identifies a direction ($\theta$)

(Continued)

of the target object on the basis of these two pieces of information (Dϕ).

7 Claims, 9 Drawing Sheets

(58) Field of Classification Search
USPC .......................................................... 342/127
See application file for complete search history.

(56) References Cited

U.S. PATENT DOCUMENTS

| | | | |
|---|---|---|---|
| 2010/0231410 | A1 | 9/2010 | Seisenberger et al. |
| 2011/0228820 | A1 | 9/2011 | De Rosa |
| 2012/0268314 | A1* | 10/2012 | Kuwahara ................. G01S 3/74 342/147 |
| 2013/0088393 | A1* | 4/2013 | Lee .......................... G01S 7/354 342/372 |
| 2013/0234831 | A1* | 9/2013 | Sabesan ............... G06K 7/0008 340/10.2 |
| 2016/0252608 | A1* | 9/2016 | Ebling .................. G01S 13/931 342/149 |

FOREIGN PATENT DOCUMENTS

| | | |
|---|---|---|
| JP | 2000-230974 A | 8/2000 |
| JP | 2004-184341 A | 7/2004 |
| JP | 2010-213035 A | 9/2010 |
| JP | 2011-145133 A | 7/2011 |
| JP | 2011-196998 A | 10/2011 |
| JP | 2012-251959 A | 12/2012 |
| WO | 2001/94974 A2 | 12/2001 |

OTHER PUBLICATIONS

Written Opinion issued in Japanese Patent Application No. PCT/JP2015/058256 dated Jun. 23, 2015.

* cited by examiner

POSITIONING SYSTEM

This is a continuation of International Application No. PCT/JP2015/058256 filed on Mar. 19, 2015 which claims priority from Japanese Patent Application No. 2014-074449 filed on Mar. 31, 2014. The contents of these applications are incorporated herein by reference in their entireties.

BACKGROUND

Technical Field

The present disclosure relates to a positioning system for detecting the position of a target object.

A positioning system including a target system that serves as a target object, and first and second systems that receive a radar pulse emitted from the target system is commonly known (see, for example, Patent Document 1). This positioning system identifies the position of the target object by using a difference between times at which the first and second systems receive the radar pulse.

Patent Document 1: Japanese Unexamined Patent Application Publication No. 4-9783

BRIEF SUMMARY

The positioning system described in Patent Document 1 calculates the position of the target object on the basis of the pulse reception times at the first and second systems. In this case, the position detection accuracy decreases if the clocks used in the first and second systems become out of synchronization from each other. To prevent such an accuracy decrease, the relative positions of the first and second systems are determined in advance and measurement is performed using only one of the clocks. This consequently requires the first and second systems to be synchronized with each other and to be installed at places different from each other, undesirably increasing the scale of the whole system.

The present disclosure has been made in view of the above-described technical issues of the related art, and the present disclosure provides a positioning system whose configuration can be simplified.

(1). To overcome the above-described issues, the present disclosure includes a measurement apparatus including a first antenna pair including two antenna elements, a second antenna pair including two antenna elements, and a signal generation circuit that generates transmission signals to be output from the antenna elements, a space between the two antenna elements of the first antenna pair and a space between the two antenna elements of the second antenna pair being set to distances different from each other, the measurement apparatus having a function of outputting transmission signals different from each other from the two antenna elements of the first antenna pair and outputting transmission signals different from each other from the two antenna elements of the second antenna pair; and a target object including a target-side antenna, a signal processing circuit that simultaneously receives from the target-side antenna two transmission signals transmitted from the measurement apparatus and processes a reception signal, and a transmission circuit that returns a processed signal from the target-side antenna to the measurement apparatus, wherein a distance and a direction of the target object from the measurement apparatus are detected by configuring the first antenna pair and the second antenna pair of the measurement apparatus to operate alternately in terms of time and by configuring the target object to transmit information processed by the signal processing circuit to the measurement apparatus with a predetermined delay.

In accordance with the present disclosure, a positioning system includes the measurement apparatus including the first antenna pair and the second antenna pair each including two antenna elements, and the target object including the signal processing circuit that processes a reception signal. The transmission signals different from each other are output from the two antenna elements of the first antenna pair. The target-side antenna receives the reception signal in which these two transmission signals are combined together. In such a case, if the transmission signals whose the phase difference changes over time or the transmission signals having frequencies slightly different from each other are output from the two antenna elements of the first antenna pair, such transmission signals cause the reception signal to beat. Accordingly, the target object can detect, by using the signal processing circuit, the phase difference caused between the target-side antenna and the two antenna elements on the basis of this beat and can return, by using the transmission circuit, the information regarding the phase difference to the measurement apparatus. Then, the measurement apparatus can detect the direction of the target object on the basis of the information regarding the phase difference.

However, since the phase difference is repeated every time the path difference between the target-side antenna and the two antenna elements changes by one wavelength, a plurality of directions may be determined in accordance with only the information regarding the phase difference obtained using the first antenna pair. However, in the present disclosure, the space between the two antenna elements of the first antenna pair and the space between the two antenna elements of the second antenna pair are set to distances different from each other. This configuration makes the phase difference caused between the target-side antenna and the two antenna elements to be different for the first antenna pair and the second antenna pair. As a result, the direction of the target object can be determined uniquely on the basis of the phase difference determined using the first antenna pair and the phase difference determined using the second antenna pair.

Further, the target object transmits the information processed by the signal processing circuit to the measurement apparatus with a predetermined delay. With this configuration, a time period from when the two transmission signals transmitted from the measurement apparatus are received by the target-side antenna to when the information regarding the phase difference processed by the signal processing circuit is returned can be set to a substantially constant value. Consequently, the measurement apparatus can determine a propagation time period taken for the signals to propagate between the measurement apparatus and the target object by measuring a time period from when the two transmitted signals are transmitted to when the predetermined information is returned and subtracting the time period taken by the target object from this time period, and can ultimately determine the distance from the measurement apparatus to the target object on the basis of this propagation time period.

In addition, since the first and second antenna pairs of the measurement apparatus alternately operate in terms of time, the first and second antenna pairs need not be synchronized with each other. Thus, the configuration of the measurement apparatus can be simplified. In addition, the first and second antenna pairs can be disposed closely to each other as long as the space between the two antenna elements of the first antenna pair and the space between the two antenna elements of the second antenna pair are set to be different. Thus, there is no need to install two systems at different positions as in the related art, and the measurement apparatus can be easily installed.

(2). In the present disclosure, the first antenna pair and the second antenna pair share one of the antenna elements thereof.

With this configuration, the number of antenna elements can be reduced, and the smaller measurement apparatus can be implemented.

(3). The present disclosure includes a measurement apparatus including an antenna pair including two antenna elements, and a signal generation circuit that generates transmission signals to be output from the antenna elements, the measurement apparatus having a function of outputting transmission signals different from each other from the two antenna elements of the antenna pair; and a target object including a target-side antenna, a signal processing circuit that simultaneously receives from the target-side antenna two transmission signals transmitted from the measurement apparatus and processes a reception signal, and a transmission circuit that returns a processed signal from the target-side antenna to the measurement apparatus, wherein a distance and a direction of the target object from the measurement apparatus are detected by configuring the measurement apparatus to output the transmission signals from the antenna pair thereof while sweeping a frequency of the transmission signals and by configuring the target object to transmit information processed by the signal processing circuit to the measurement apparatus with a predetermined delay.

In accordance with the present disclosure, a positioning system includes the measurement apparatus including the antenna pair including two antenna elements, and the target object including the signal processing circuit that processes a reception signal. The transmission signals different from each other are output from the two antenna elements of the antenna pair. The target-side antenna receives the reception signal in which these two transmission signals are combined together. In such a case, if the transmission signals whose the phase difference changes over time or the transmission signals having frequencies slightly different from each other are output from the two antenna elements of the antenna pair, such transmission signals cause the reception signal to beat. Accordingly, the target object can detect, by using the signal processing circuit, the phase difference caused between the target-side antenna and the two antenna elements on the basis of this beat and can return, by using the transmission circuit, the information regarding the phase difference to the measurement apparatus. Then, the measurement apparatus can detect the direction of the target object on the basis of the information regarding the phase difference.

However, since the phase difference is repeated every time the path difference between the target-side antenna and the two antenna elements changes by one wavelength, a plurality of directions may be determined in accordance with only the information regarding the single phase difference. However, in the present disclosure, the transmission signals are output from the antenna pair of the measurement apparatus while a frequency of the transmission signals being swept. This configuration makes the phase difference caused between the target-side antenna and the two antenna elements to be different for transmission signals having different frequencies. At that time, the phase difference caused between the target-side antenna and the two antenna elements changes in accordance with the frequency of the transmission signals. Accordingly, the direction of the target object can be determined uniquely on the basis of the plurality of phase differences determined using the transmission signals having different frequencies.

Further, the target object transmits the information processed by the signal processing circuit to the measurement apparatus with a predetermined delay. With this configuration, a propagation time period taken for the signals to propagate between the measurement apparatus and the target object can be determined, and ultimately the distance from the measurement apparatus to the target object can be determined on the basis of this propagation time period.

In addition, since synchronization of the first and second antenna pairs is not need, the configuration of the measurement apparatus can be simplified. In addition, since the signals just need to be radiated from the antenna pair while the frequency thereof being swept, there is no need to install two systems at different positions as in the related art. Thus, the measurement apparatus can be easily installed. In this case, since the measurement apparatus of the positioning system includes a single antenna pair including two antenna elements, the distance to and the direction of the target object can be detected by using a simple configuration.

(4). In the present disclosure, the measurement apparatus outputs the transmission signals from the antenna pair by changing the frequency of the transmission signals to two or more kinds of frequencies.

In this case, the transmission signals different from each other are output from the two antenna elements of the antenna pair. Then, the carrier frequency of the transmission signals can be changed, and the transmission signals different from each other can be output from the two antenna elements of the antenna pair. Consequently, the direction of the target object can be identified on the basis of the plurality of phase differences detected by changing the carrier frequency to two or more kinds of frequencies.

(5). In the present disclosure, the signal generation circuit of the measurement apparatus includes a voltage-controlled oscillator.

Accordingly, the frequency of the signals transmitted from the measurement apparatus can be changed by adjustment of control voltage, and thus the positioning system can have a simpler circuit configuration.

(6). In the present disclosure, the signal generation circuit of the measurement apparatus includes an oscillator and a phase shifter.

With this configuration, the phase of the signal output by the oscillator can be shifted by the phase shifter, and thus the positioning system can have a simpler circuit configuration.

DETAILED DESCRIPTION

A positioning system according to embodiments of the present disclosure will be described in detail below with reference to the accompanying drawings.

Figure 1:
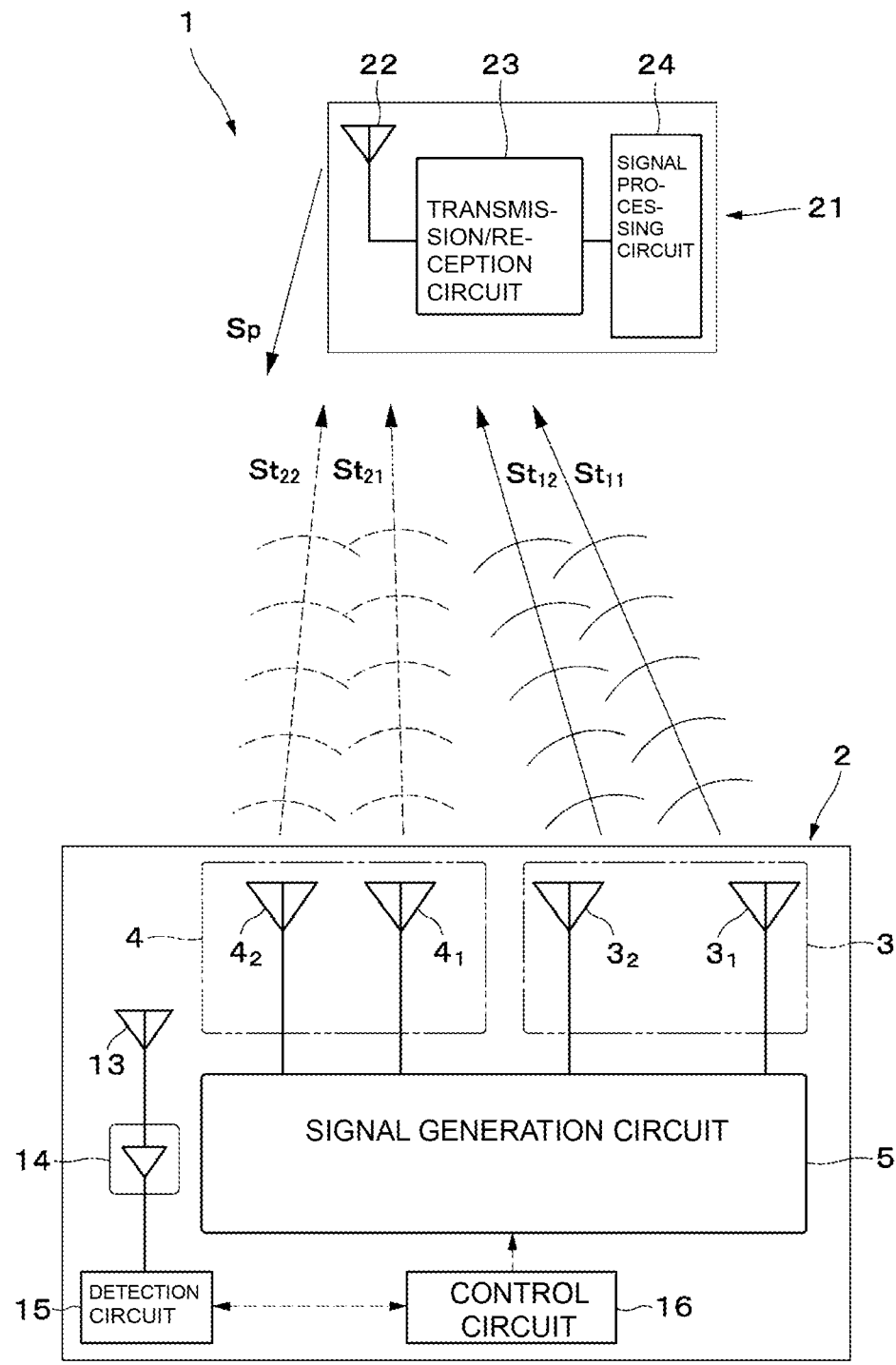
FIG. 1 is a circuit diagram illustrating an overall configuration of a positioning system according to a first embodiment.
Figure 2:
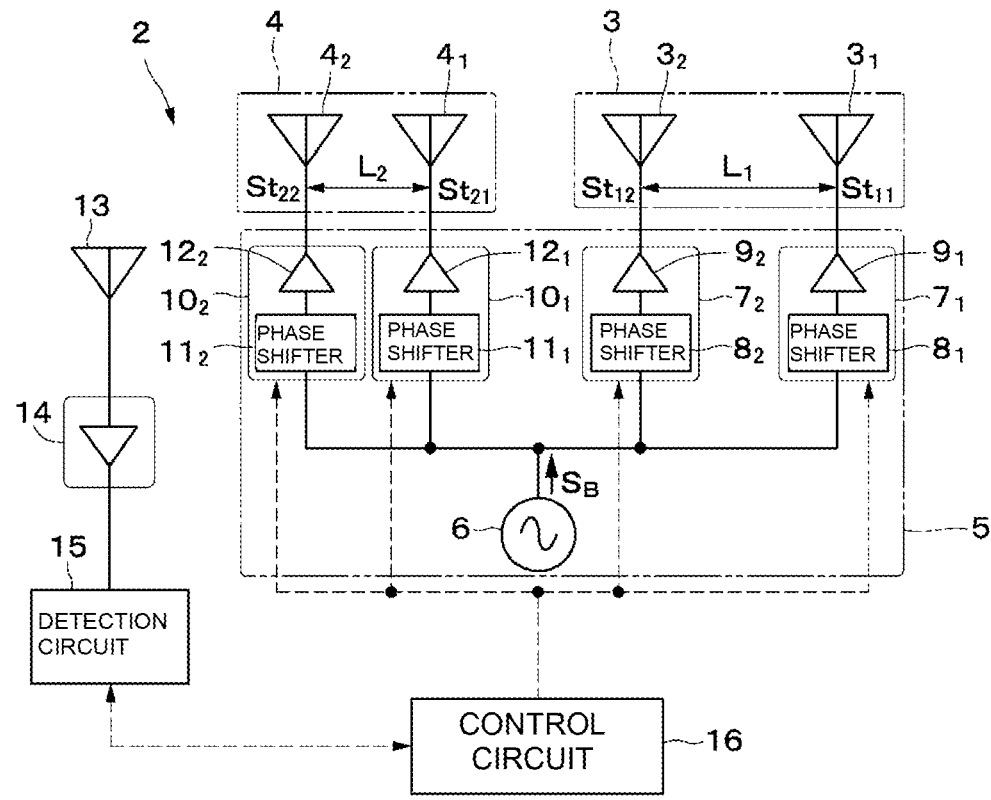
FIG. 2 is a circuit diagram illustrating an overall configuration of a measurement apparatus illustrated in FIG. 1.
Figure 3:
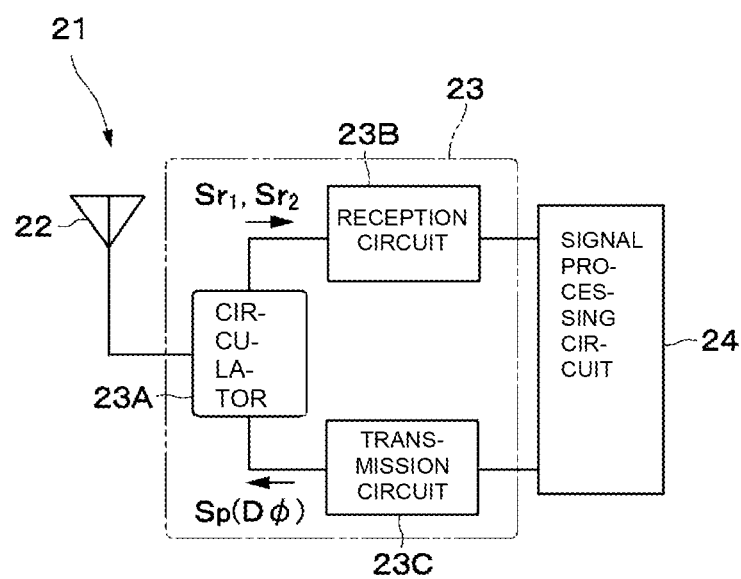
FIG. 3 is a circuit diagram illustrating an overall configuration of a target object illustrated in FIG. 1.

FIG. 1 to FIG. 3 illustrate a positioning system 1 according to a first embodiment. The positioning system 1 includes a measurement apparatus 2 and a target object 21, for example.

The measurement apparatus 2 will be described first. The measurement apparatus 2 includes a first antenna pair 3, a second antenna pair 4, and a signal generation circuit 5. The first antenna pair 3 includes antenna elements $3_1$ and $3_2$. The second antenna pair 4 includes antenna elements $4_1$ and $4_2$. The signal generation circuit 5 generates transmission signals $St_{11}$, $St_{12}$, $St_{21}$, and $St_{22}$ to be output from the antenna elements $3_1$, $3_2$, $4_1$, and $4_2$, respectively. Each of the antenna elements $3_1$, $3_2$, $4_1$, and $4_2$ is connected to the signal generation circuit 5.

The antenna elements $3_1$, $3_2$, $4_1$, and $4_2$ are implemented as various kinds of antennas capable of radiating the transmission signals $St_{11}$, $St_{12}$, $St_{21}$, and $St_{22}$, respectively. As illustrated in FIG. 2, the first antenna element $3_1$ and the second antenna element $3_2$ are spaced apart by a space $L_1$ in the first antenna pair 3. On the other hand, the first antenna element $4_1$ and the second antenna element $4_2$ are spaced apart by a space $L_2$ in the second antenna pair 4. The space $L_1$ between the antenna elements $3_1$ and $3_2$ and the space $L_2$ between the antenna elements $4_1$ and $4_2$ are set to distances different from each other.

The antenna elements $3_1$ and $3_2$ are respectively connected to modulation circuits $7_1$ and $7_2$ described later. The antenna elements $3_1$ and $3_2$ respectively radiate the transmission signals $St_{11}$ and $St_{12}$ that are different from each other and have phases modulated by the modulation circuits $7_1$ and $7_2$. Likewise, the antenna elements $4_1$ and $4_2$ are respectively connected to modulation circuits $10_1$ and $10_2$ described later. The antenna elements $4_1$ and $4_2$ respectively radiate the transmission signals $St_{21}$ and $St_{22}$ that are different from each other and have phases modulated by the modulation circuits $10_1$ and $10_2$.

The antenna elements $3_1$, $3_2$, $4_1$, and $4_2$ may be non-directional antennas or directional antennas. The antenna elements $3_1$, $3_2$, $4_1$, and $4_2$ illustrated in FIG. 2 are arranged in a line in the horizontal direction, for example. In such case, a reception signal $Sr_1$, in which the transmission signals $St_{11}$ and $St_{12}$ are combined together, has the same characteristics in front of and behind the antenna elements $3_1$, $3_2$, $4_1$, and $4_2$ (on the upper and lower sides in FIG. 2). Likewise, a reception signal $Sr_2$, in which the transmission signals $St_{21}$ and $St_{22}$ are combined together, has the same characteristics in front of and behind the antenna elements $3_1$, $3_2$, $4_1$, and $4_2$. Accordingly, when the transmission signals $St_{11}$, $St_{12}$, $St_{21}$, and $St_{22}$ are radiated in all directions, the direction of the target object 21 is not identifiable. Thus, the antenna elements $3_1$, $3_2$, $4_1$, and $4_2$ desirably have a directivity to radiate the transmission signals $St_{11}$, $St_{12}$, $St_{21}$, and $St_{22}$ only in a front direction of the measurement apparatus 2, respectively. In addition, if a range in which the target object 21 is detected is predetermined, the directivity of the antenna elements $3_1$, $3_2$, $4_1$, and $4_2$ may be set such that the transmission signals $St_{11}$, $St_{12}$, $St_{21}$, and $St_{22}$ are radiated toward that range. In this case, radiation of extra electromagnetic waves can be suppressed and loss can be reduced.

Note that the antenna elements $3_1$, $3_2$, $4_1$, and $4_2$ are not limited to those arranged in a straight line and may be arranged in a curved line. In addition, the antenna elements $3_1$, $3_2$, $4_1$, and $4_2$ may be arranged such that the positions of the antenna elements $3_1$ and $3_2$ and the antenna elements $4_1$ and $4_2$ are shifted from each other in a front-rear direction or cross each other, for example. However, as described later, if a signal processing circuit 24 of the target object 21 performs the same signal processing when the first antenna pair 3 operates and when the second antenna pair 4 operates, the circuit configuration of the target object 21 can be simplified. From this viewpoint, the positional relationship between the first antenna element $3_1$ and the second antenna element $3_2$ of the first antenna pair 3 can be identical to the positional relationship between the first antenna element $4_1$ and the second antenna element $4_2$ of the second antenna pair 4.

The signal generation circuit 5 includes an oscillator 6 and the modulation circuits $7_1$, $7_2$, $10_1$, and $10_2$. The oscillator 6 outputs, to the modulation circuits $7_1$, $7_2$, $10_1$, and $10_2$, a high-frequency signal as a reference signal $S_B$ (carrier wave) that serves as a reference of the transmission signals $St_{11}$, $St_{12}$, $St_{21}$, and $St_{22}$, respectively. The high-frequency signal may be, for example, of a microwave or an millimeter wave. The wavelength of the reference signal $S_B$ is appropriately set in accordance with, for example, the dimensions of the target object 21 that serves as the detection target.

The modulation circuits $7_1$ and $7_2$ are respectively connected to the antenna elements $3_1$ and $3_2$ of the first antenna pair 3. The modulation circuits $7_1$ and $7_2$ respectively control the phase and amplitude of the transmission signals $St_{11}$ and $St_{12}$. The modulation circuit $7_1$ includes a phase shifter $8_1$ and an amplifier $9_1$, and the modulation circuit $7_2$ includes a phase shifter $8_2$ and an amplifier $9_2$. Input terminals of the modulation circuits $7_1$ and $7_2$ are connected to the oscillator 6, and output terminals of the modulation circuits $7_1$ and $7_2$ are respectively connected to the antenna elements $3_1$ and $3_2$ of the first antenna pair 3. The modulation circuits $7_1$ and $7_2$ are controlled by a control circuit 16 described later to operate in synchronization with each other, and the phase of the phase shifters $8_1$ and $8_2$ and the gain of the amplifiers $9_1$ and $9_2$ are controlled.

The phase shifters $8_1$ and $8_2$ perform, independently for the antenna elements $3_1$ and $3_2$, phase modulation on the reference signal $S_B$ output from the oscillator 6 and generate the transmission signals $St_{11}$ and $St_{12}$ having phases $\phi_{11}$ and $\phi_{12}$ as a result of modulation, respectively. At that time, the first transmission signal $St_{11}$ output from the first antenna element $3_1$ is configured to be a continuous-wave signal that has always constant phase, for example. Accordingly, the phase shifter $8_1$ outputs the reference signal $S_B$ without necessarily changing the phase thereof. In contrast, the second transmission signal $St_{12}$ output from the second antenna element $3_2$ is configured to have a carrier frequency f identical to that of the first transmission signal $St_{11}$ and have a phase slightly shifted in every predetermined time period. Accordingly, the phase shifter $8_2$ outputs the reference signal $S_B$ by sweeping the phase thereof. That is, a phase difference $\Delta\phi_1$ ($\Delta\phi_1=\phi_{11}-\phi_{12}$) between the phase $\phi_{11}$ of the first transmission signal $St_{11}$ and the phase $\phi_{12}$ of the second transmission signal $St_{12}$ changes over time t ($\Delta\phi_1=\Delta\phi_1(t)$). At that time, the range over which the phase difference $\Delta\phi_1$ changes is set to be greater than or equal to at least $2\pi$.

The amplifiers $9_1$ and $9_2$ constitute the modulation circuits $7_1$ and $7_2$ together with the phase shifters $8_1$ and $8_2$ and amplify powers of the transmission signals $St_{11}$ and $St_{12}$ radiated from the antenna elements $3_1$ and $3_2$ to levels at which the target object 21 is detectable, respectively. When the first antenna pair 3 radiates the transmission signals $St_{11}$ and $St_{12}$, the gain of the amplifiers $9_1$ and $9_2$ is increased and the gain of amplifiers $12_1$ and $12_2$ is decreased. On the other hand, when the second antenna pair 4 radiates the transmission signals $St_{21}$ and $St_{22}$, the gain of the amplifiers $9_1$ and $9_2$ is decreased and the gain of the amplifiers $12_1$ and $12_2$ is increased. In this way, when the first antenna pair 3 radiates the transmission signals $St_{11}$ and $St_{12}$, radiation of the transmission signals $St_{21}$ and $St_{22}$ from the second antenna pair 4 can be stopped. On the other hand, when the second antenna pair 4 radiates the transmission signals $St_{21}$ and $St_{22}$, radiation of the transmission signals $St_{11}$ and $St_{12}$ from the first antenna pair 3 can be stopped. Consequently, the first antenna pair 3 and the second antenna pair 4 operate alternately in terms of time. Note that the first transmission signal $St_{11}$ and the second transmission signal $St_{12}$ may have different signal strengths by making the gains of the amplifiers $9_1$ and $9_2$ different. In this case, even when the phase $\phi_{11}$ of the first transmission signal $St_{11}$ and the phase $\phi_{12}$ of the second transmission signal $St_{12}$ are opposite to each other and the first transmission signal $St_{11}$ and the second transmission signal $St_{12}$ attenuate each other, complete cancellation of the signals can be prevented.

The modulation circuits $10_1$ and $10_2$ are respectively connected to the antenna elements $4_1$ and $4_2$ of the second antenna pair 4. The modulation circuits $10_1$ and $10_2$ respectively control the phase and amplitude of the transmission signals $St_{21}$ and $St_{22}$. The modulation circuit $10_1$ includes a phase shifter $11_1$ and the amplifier $12_1$, and the modulation circuit $10_2$ includes a phase shifter $11_2$ and the amplifier $12_2$. Input terminals of the modulation circuits $10_1$ and $10_2$ are connected to the oscillator 6, and output terminals of the modulation circuits $10_1$ and $10_2$ are respectively connected to the antenna elements $4_1$ and $4_2$ of the second antenna pair 4. The modulation circuits $10_1$ and $10_2$ are controlled by the control circuit 16 described later to operate in synchronization with each other, and the phase of the phase shifters $11_1$ and $11_2$ and the gain of the amplifiers $12_1$ and $12_2$ are controlled.

The phase shifters $11_1$ and $11_2$ perform, independently for the antenna elements $4_1$ and $4_2$, phase modulation on the reference signal $S_B$ output from the oscillator 6 and generate the transmission signals $St_{21}$ and $St_{21}$ having phases $\phi_{21}$ and $\phi_{21}$ as a result of modulation, respectively. The phase shifters $11_1$ and $11_2$ are configured substantially in the same manner as the phase shifters $8_1$ and $8_2$. Accordingly, the phase shifter $11_1$ outputs the reference signal $S_B$ without necessarily changing the phase thereof for example, whereas the phase shifter $11_2$ outputs the reference signal $S_B$ by sweeping the phase thereof. Consequently, a phase difference $\Delta\phi_2$ ($\Delta\phi_2=\phi_{21}-\phi_{22}$) between the phase $\phi_{21}$ of the first transmission signal $St_{21}$ and the phase $\phi_{22}$ of the second transmission signal $St_{22}$ changes over time t ($\Delta\phi_2=\Delta\phi_2(t)$). At that time, the range over which the phase difference $\Delta\phi_2$ changes is set to be greater than or equal to at least $2\pi$.

The amplifiers $12_1$ and $12_2$ constitute the modulation circuits $10_1$ and $10_2$ together with the phase shifters $11_1$ and $11_2$ and amplify powers of the transmission signals $St_{21}$ and $St_{22}$ radiated from the antenna elements $4_1$ and $4_2$ to levels at which the target object 21 is detectable, respectively. When the second antenna pair 4 radiates the transmission signals $St_{21}$ and $St_{22}$, the gain of the amplifiers $12_1$ and $12_2$ is increased and the gain of the amplifiers $9_1$ and $9_2$ is decreased. On the other hand, when the first antenna pair 3 radiates the transmission signals $St_{11}$ and $St_{12}$, the gain of the amplifiers $12_1$ and $12_2$ is decreased and the gain of the amplifiers $9_1$ and $9_2$ is increased. Consequently, the first antenna pair 3 and the second antenna pair 4 operate alternately in terms of time. Note that the first transmission signal $St_{21}$ and the second transmission signal $St_{22}$ may have different signal strengths by making the gains of the amplifiers $12_1$ and $12_2$ different, just like the amplifiers $9_1$ and $9_2$.

A reception antenna element 13 is provided separately from the antenna elements $3_1$, $3_2$, $4_1$, and $4_2$ and receives a return signal Sp from the target object 21 described later. The return signal Sp received by the reception antenna element 13 is input to a detection circuit 15 after power thereof is amplified by a reception amplifier 14. The detection circuit 15 demodulates the return signal Sp to obtain information $D\phi$ and detects a distance and a direction of the target object 21 from the measurement apparatus 2 on the basis of the information $D\phi$ returned from the target object 21. An output terminal of the detection circuit 15 is connected to the control circuit 16 described later.

Figure 7:
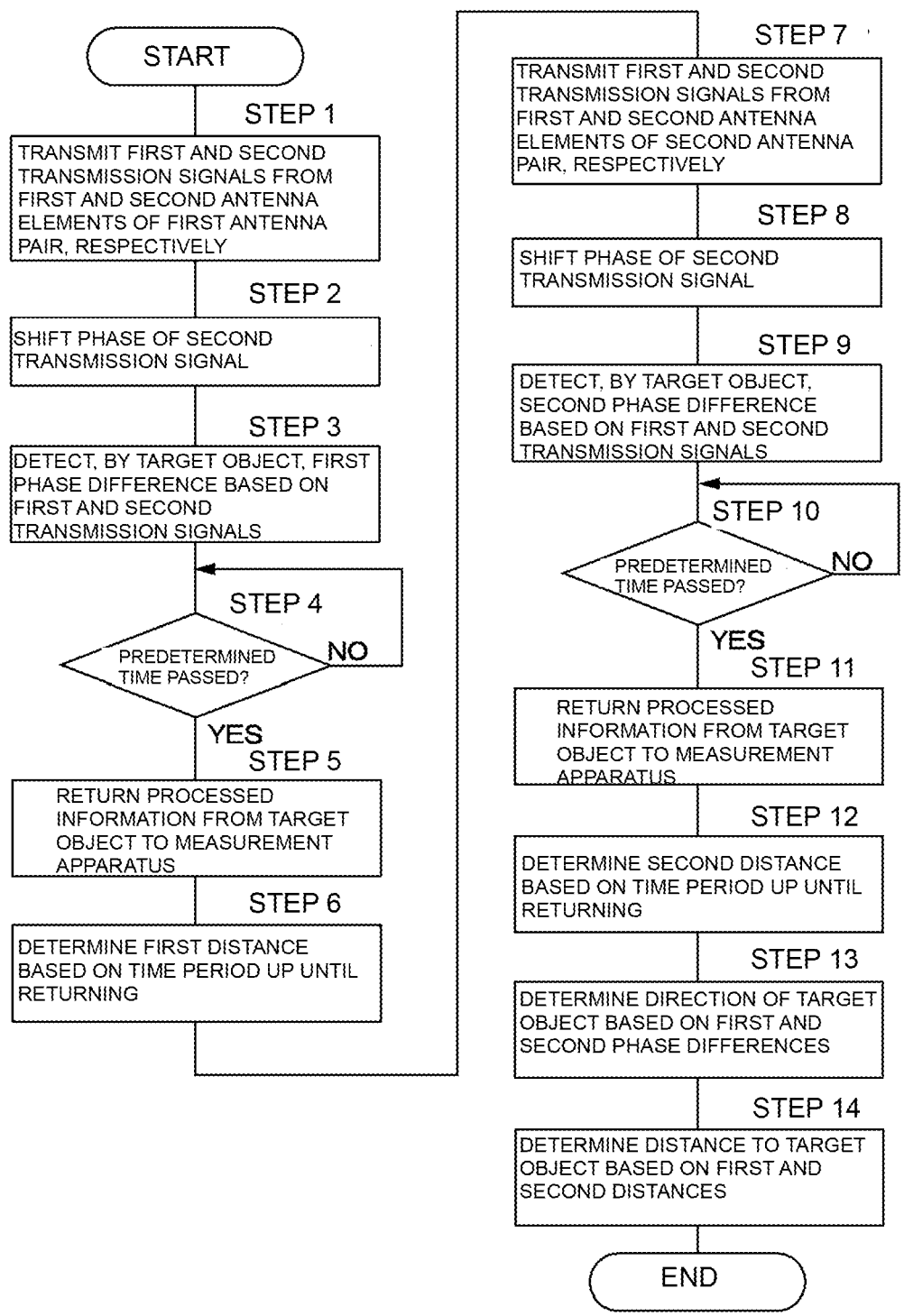
FIG. 7 is a flowchart illustrating overall processing of the positioning system according to the first embodiment.

The control circuit 16 is implemented by, for example, a microcomputer or the like, and operates in accordance with a processing procedure illustrated in FIG. 7. The control circuit 16 controls the phase shifters $8_1$, $8_2$, $11_1$, and $11_2$ and the amplifiers $9_1$, $9_2$, $12_1$, and $12_2$ of the modulation circuits $7_1$, $7_2$, $10_1$, and $10_2$, respectively. An input terminal of the control circuit 16 is connected to the detection circuit 15. The control circuit 16 is informed of a timing at which the detection circuit 15 has obtained the information $D\phi$ transmitted from the target object 21 as a result of demodulation. In addition, an output terminal of the control circuit 16 is connected to the modulation circuits $7_1$, $7_2$, $10_1$, and $10_2$ and the detection circuit 15.

The control circuit 16 controls the phase shifters $8_1$ and $8_2$ of the modulation circuits $7_1$ and $7_2$ to adjust the phases $\phi_{11}$ and $\phi_{12}$ of the transmission signals $St_{11}$ and $St_{12}$, respectively, and ultimately controls the phase difference $\Delta\phi_1$. Likewise, the control circuit 16 controls the phase shifters $11_1$ and $11_2$ of the modulation circuits $10_1$ and $10_2$ to adjust the phases $\phi_{21}$ and $\phi_{22}$ of the transmission signals $St_{21}$ and $St_{22}$, respectively, and ultimately controls the phase difference $\Delta\phi_2$. In addition, the control circuit 16 controls the gains of the amplifiers $9_1$, $9_2$, $12_1$, and $12_2$ on the basis of the timing at which the detection circuit 15 has obtained the information $D\phi$ as a result of demodulation, and switches between output of the transmission signals $St_{11}$ and $St_{12}$ and output of the transmission signals $St_{21}$ and $St_{22}$.

The target object 21 will be described next. The target object 21 includes a target-side antenna 22, a transmission/reception circuit 23, and the signal processing circuit 24. The target object 21 receives the transmission signals $St_{11}$, $St_{12}$, $St_{21}$, and $St_{22}$ output from the measurement apparatus 2 and returns signal-processed information $D\phi$ to the measurement apparatus 2.

The target-side antenna 22 is implemented as, for example, a non-directional antenna to be able to receive the transmission signals $St_{11}$, $St_{12}$, $St_{21}$, and $St_{22}$ output from the measurement apparatus 2 and coming from all the directions. The target-side antenna 22 is connected to the transmission/reception circuit 23.

When the first antenna pair 3 operates, the target-side antenna 22 simultaneously receives the transmission signals $St_{11}$ and $St_{12}$ output from the measurement apparatus 2 and outputs to the transmission/reception circuit 23 a reception signal $Sr_1$ in which these transmission signals are combined together. When the second antenna pair 4 operates, the target-side antenna 22 simultaneously receives the transmission signals $St_{21}$ and $St_{22}$ output from the measurement apparatus 2 and outputs to the transmission/reception circuit 23 a reception signal $Sr_2$ in which these transmission signals are combined together. When the phase difference $\Delta\phi_1$ between the phases of the transmission signals $St_{11}$ and $St_{12}$ changes over time, the reception signal $Sr_1$ has a beat waveform. Likewise, when the phase difference $\Delta\phi_2$ between the phases of the transmission signals $St_{21}$ and $St_{22}$ changes over time, the reception signal $Sr_2$ has a beat waveform.

The target-side antenna 22 also returns to the measurement apparatus 2 the high-frequency return signal Sp including the information $D\phi$. When the positional relationship between the target object 21 and the measurement apparatus 2 is identified to some extent, the target-side antenna 22 may be a directional antenna.

The transmission/reception circuit 23 includes a circulator 23A, a reception circuit 23B, and a transmission circuit 23C. The circulator 23A outputs the reception signals $Sr_1$ and $Sr_2$ received by the target-side antenna 22 to the reception circuit 23B. The circulator 24A also outputs the return signal Sp supplied from the transmission circuit 23C to the target-side antenna 22.

The reception circuit 23B outputs the reception signals $Sr_1$ and $Sr_2$ received by the target-side antenna 22 to the signal processing circuit 24. An input terminal of the reception circuit 23B is connected to the circulator 23A, and an output terminal of the reception circuit 23B is connected to the signal processing circuit 24. The reception circuit 23B includes, for example, an amplifier and a filter. The reception circuit 23B amplifies the reception signals $Sr_1$ and $Sr_2$ and removes noise from the reception signals $Sr_1$ and $Sr_2$.

The transmission circuit 23C returns from the target-side antenna 22 to the measurement apparatus 2, the return signal Sp carrying the information $D\phi$ on which signal processing has been performed by the signal processing circuit 24. An input terminal of the transmission circuit 23C is connected to the signal processing circuit 24, whereas an output terminal thereof is connected to the circulator 23A. The transmission circuit 23C includes, for example, an oscillator, a modulation circuit, and an amplifier. The transmission circuit 23C modulates a high-frequency carrier wave on the basis of the information $D\phi$ on which signal processing has been performed by the signal processing circuit 24 to generate the return signal Sp and amplifies power of the return signal Sp.

The signal processing circuit 24 processes the reception signals $Sr_1$ and $Sr_2$ and outputs the information $D\phi$ regarding the phase reference $\Delta\phi_{10}$ according to a distance difference $\Delta r_1$ between distances between the target object 21 and the first antenna element $3_1$ and the second antenna element $3_2$ and regarding the phase reference $\Delta\phi_{20}$ according to a distance difference $\Delta r_2$ between distances between the target object 21 and the first antenna element $4_1$ and the second antenna element $4_2$. For example, when the two transmission signals $St_{11}$ and $St_{12}$ transmitted from the measurement apparatus 2 are simultaneously received by the target-side antenna 22, the signal processing circuit 24 processes the reception signal $Sr_1$ based on these two transmission signals $St_{11}$ and $St_{12}$. In this case, the signal processing circuit 24 processes the reception signal $Sr_1$ received by the target-side antenna 22 and measures a first phase difference $\Delta\phi_{10}$ caused between the target-side antenna 22 and the antenna elements $3_1$ and $3_2$ of the first antenna pair 3. At that time, the signal strength of the reception signal $Sr_1$ changes in accordance with the phase difference $\Delta\phi_1$ that changes over time. When the phase difference $\Delta\phi_1$ becomes a value corresponding to the first phase difference $\Delta\phi_{10}$, the signal strength of the reception signal $Sr_1$ becomes the largest. Accordingly, the signal processing circuit 24 measures a time period from when shifting of the phase $\phi_{12}$ for the second antenna element 32 is started to when the signal strength of the reception signal $Sr_1$ becomes the largest. In this way, the signal processing circuit 24 detects the first phase difference $\Delta\phi_{10}$ based on the transmission signals $St_{11}$ and $St_{12}$.

Likewise, when the two transmission signals $St_{21}$ and $St_{22}$ transmitted from the measurement apparatus 2 are simultaneously received from the target-side antenna 22, the signal processing circuit 24 processes the reception signal $Sr_2$ based on these two transmission signals $St_{21}$ and $St_{22}$. In this case, the signal processing circuit 24 processes the reception signal $Sr_2$ received by the target-side antenna 22 and detects a second phase difference $\Delta\phi_{20}$ caused between the target-side antenna 22 and the antenna elements $4_1$ and $4_2$ of the second antenna pair 4. The signal processing circuit 24 then outputs, as the information $D\phi$, the detected first phase difference $\Delta\phi_{10}$ and the detected second phase difference $\Delta\phi_{20}$ to the target-side antenna 22 via the transmission circuit 23C.

An operation of the positioning system 1 according to this embodiment will be described next by using FIG. 4 to FIG. 7.

First in step 1 in FIG. 7, the operation of the first antenna pair 3 is started while keeping the operation of the second antenna pair 4 stopped. Specifically, the first and second transmission signals $St_{11}$ and $St_{12}$ are respectively transmitted from the first and second antenna elements $3_1$ and $3_2$ of the first antenna pair 3. At that time, both of the first transmission signal $St_{11}$ output from the first antenna element $3_1$ and the second transmission signal $St_{12}$ output from the second antenna element $3_2$ are configured to have the carrier frequency f and to be in phase. Note that the first transmission signal $St_{11}$ and the second transmission signal $St_{12}$ need not necessarily be in phase (have the phase difference $\Delta\phi_1$ of zero) and may have a predetermined phase difference $\Delta\phi_1$.

Figure 6:
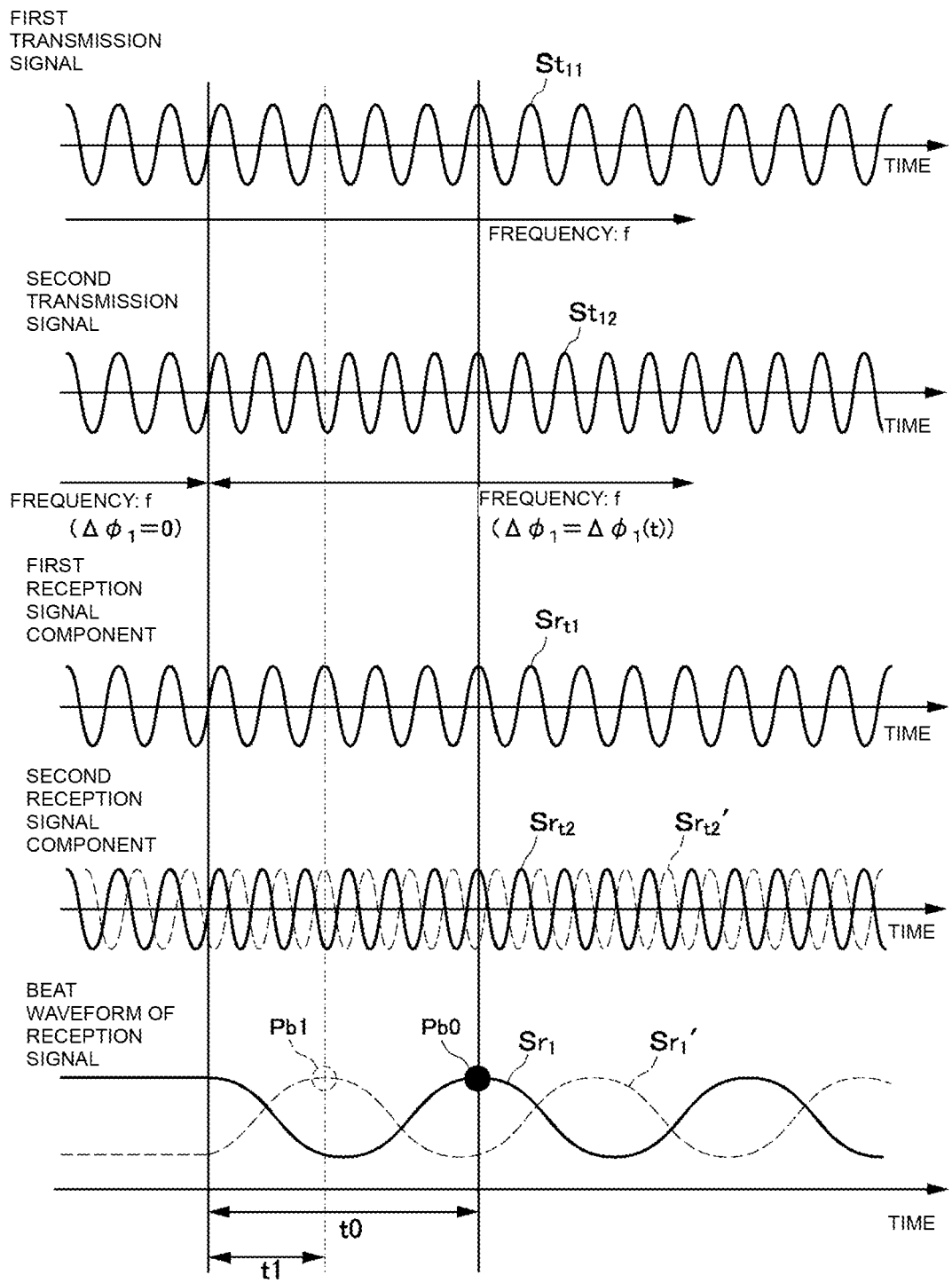
FIG. 6 is a characteristics diagram illustrating waveforms of transmission signals and waveforms of reception signals in the first embodiment.

Then in step 2, the second transmission signal $St_{12}$ is output while the phase $\phi_{12}$ thereof is being shifted. In this case, as illustrated in FIG. 6, the first transmission signal $St_{11}$ output from the first antenna element $3_1$ is a continuous wave signal having the carrier frequency f and the constant phase $\phi_{11}$. In contrast, the second transmission signal $St_{12}$ output from the second antenna element $3_2$ is a signal having the same carrier frequency f as the first transmission signal $St_{11}$ but having the phase $\phi_{12}$ slightly shifted in every predetermined time period. That is, the phase difference $\Delta\phi_1$ between the phase $\phi_{11}$ of the first transmission signal $St_{11}$ and the phase $\phi_{12}$ of the second transmission signal $St_{12}$ changes over time t ($\Delta\phi_1=\Delta\phi_1(t)$).

Then in step 3, the target object 21 detects the first phase difference $\Delta\phi_{10}$ on the basis of the first transmission signal $St_{11}$ and the second transmission signal $St_{12}$. The first phase difference $\Delta\phi_{10}$ is based on the distance difference $\Delta r_1$ between distances from the antenna elements $3_1$ and $3_2$ to the target object 21. A method for detecting the first phase difference $\Delta\phi_{10}$ will be described in detail below.

Figure 4:
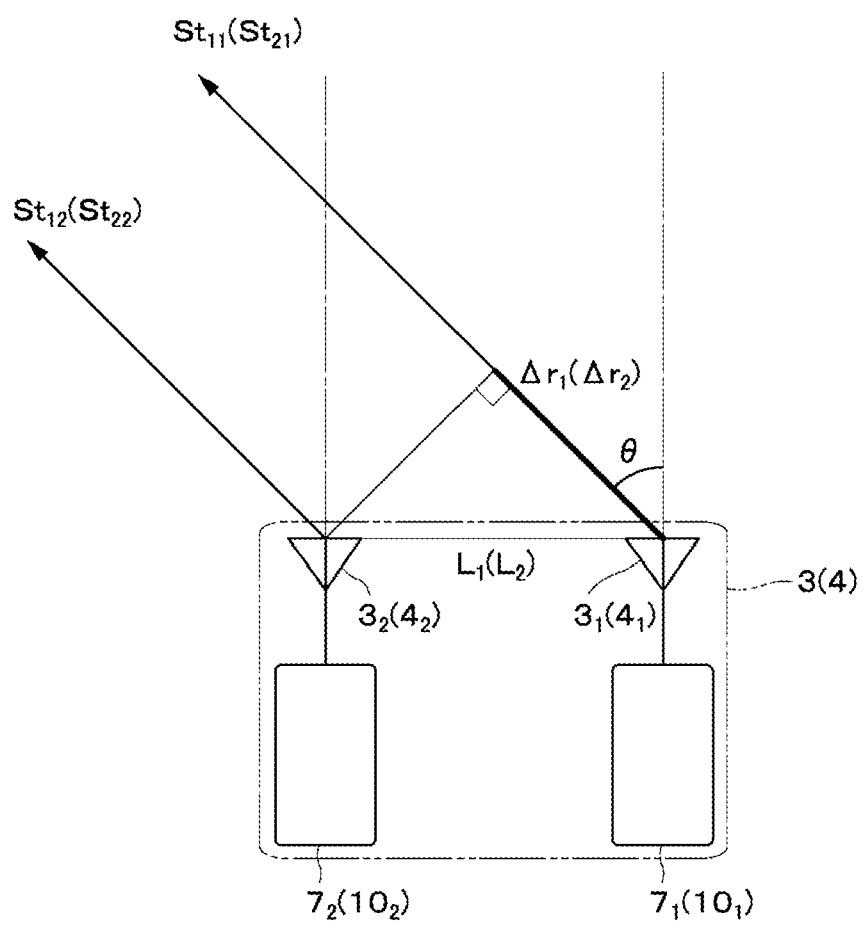
FIG. 4 is an explanatory diagram illustrating a path difference and a radiation angle for transmission signals transmitted by the measurement apparatus.

As illustrated in FIG. 4, $L_1$ denotes the space between the antenna elements $3_1$ and $3_2$, $\theta$ denotes the direction of the target object 21 with respect to the reference direction, and $\lambda$ denotes the wavelength for the carrier frequency f. Then, a relationship between the first phase difference $\Delta\phi_{10}$ and the distance difference $\Delta r_1$ (path difference) between the distances from the antenna elements $3_1$ and $3_2$ to the target object 21 (the target-side antenna 22) is denoted by Equation 1 below. Note that the reference direction is, for example, a direction for which the distance difference $\Delta r_1$ is substantially zero and is a direction perpendicular to a direction in which the antenna elements $3_1$ and $3_2$ are arranged at the central position between the antenna elements $3_1$ and $3_2$.

$$\Delta\phi_{10} = \frac{2\pi\Delta r_1}{\lambda} = \frac{2\pi L_1 \sin\theta}{\lambda} \qquad \text{[Math. 1]}$$

For example, suppose that the space $L_1$ is 30 cm, the carrier frequency f is 5 GHz, and the wavelength $\lambda$ is 6 cm. In this case, the first phase difference $\Delta\phi_{10}$ is denoted by Equation 2 below. In this case, every time the direction $\theta$ of the target object 21 changes by approximately 11.5 degrees, the first phase difference $\Delta\phi_{10}$ between the phases of the first transmission signal $St_{11}$ and the second transmission signal $St_{12}$ changes by $2\pi$.

$$\Delta\phi_{10}=2\pi\cdot 5\cdot \sin\theta \qquad \text{[Math. 2]}$$

On the other hand, the phase difference $\Delta\phi_1$ between the phases of the two transmission signals $St_{11}$ and $St_{12}$ changes over time. Accordingly, when the phase difference $\Delta\phi_{10}$ based on the distance difference $\Delta r_1$ matches the phase difference $\Delta\phi_1$ between the phases of the first and second transmission signals $St_{11}$ and $St_{12}$, the two transmission signals $St_{11}$ and $St_{12}$ enhance each other. At that time, the reception power of the reception signal $Sr_1$ becomes the largest, and the beat waveform of the reception signal $Sr_1$ has a peak. Specifically, as illustrated in FIG. 6, the reception signal $Sr_1$ includes a first reception signal component $Sr_{r1}$ based on the first transmission signal $St_{11}$ and a second reception signal component $Sr_{r2}$ based on the second transmission signal $St_{12}$. When the phase difference $\Delta\phi_{10}$ based on the distance difference $\Delta r_1$ matches the phase difference $\Delta\phi_1$ between the phases of the first and second transmission signals $St_{11}$ and $St_{12}$, the phase difference $\Delta\phi_{10}$ is cancelled out by the phase difference $\Delta\phi_1$, and the phases of these two reception signal components $Sr_{r1}$ and $Sr_{r2}$ match each other. Consequently, the reception power of the reception signal $Sr_1$ reaches a peak value Pb0.

When the reception power of the reception signal $Sr_1$ reaches the peak value Pb0, the signal power of the beat waveform of the reception signal $Sr_1$ becomes the largest and a time period that has elapsed from when shifting of the phase $\phi_{12}$ of the second transmission signal $St_{12}$ has been started is equal to t0. In this case, the time t0 from when shifting of the phase $\phi_{12}$ is started to when the peak value Pb0 is reached corresponds to the first phase difference $\Delta\phi_{10}$.

Figure 5:
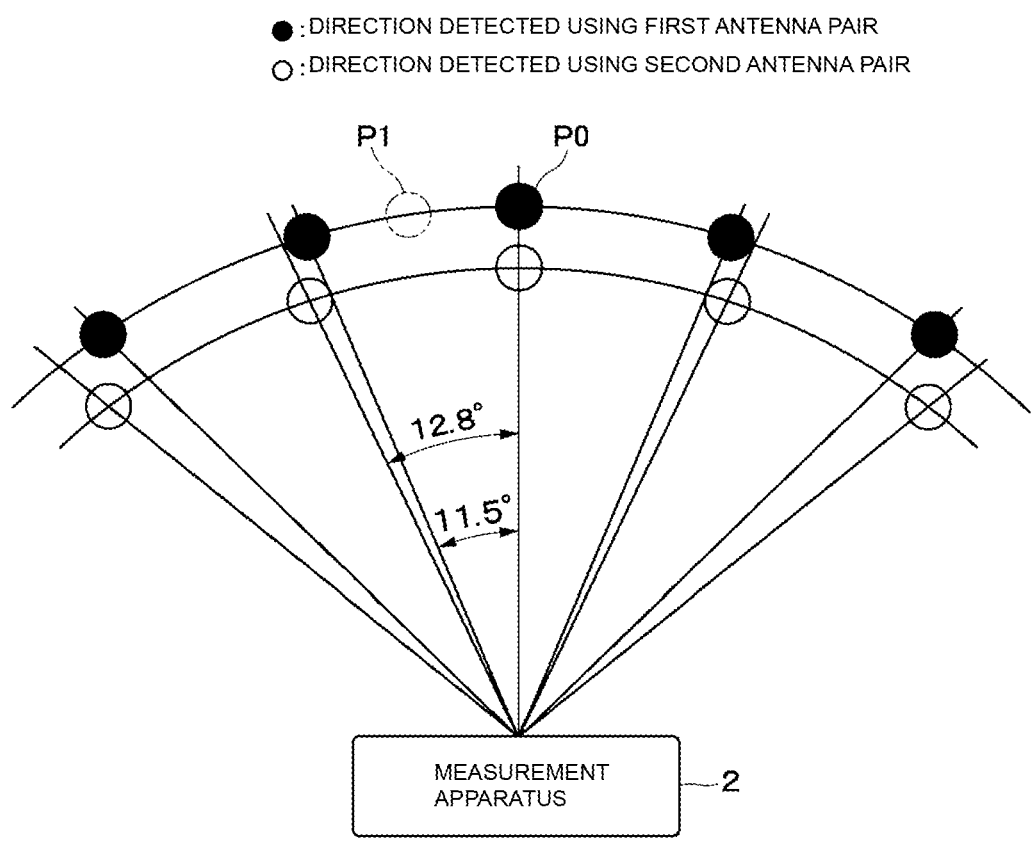
FIG. 5 is an explanatory diagram illustrating a direction detected using a first antenna pair and a direction detected using a second antenna pair.

For example, as illustrated in FIG. 5, the distance difference $\Delta r_1$ differs between the case where the target object 21 is located at a position P1 and the case where the target object 21 is located at a position P0 that is in a direction different from that of the position P1. Accordingly, as indicated by a dashed line in FIG. 6, a second reception signal component $Sr_{r2}'$ received at the position P1 and the second reception signal component $Sr_{r2}$ received at the position P0 are out of phase. Since the beat waveform of the reception signal $Sr_1'$ received at the position P1 and the beat waveform of the reception signal $Sr_1$ received at the position P0 are out of phase, the reception signal $S_{r1}'$ reaches a peak value Pb1 at a time point different from the time point of the peak value Pb0 of the reception signal $Sr_1$. Consequently, when the target object 21 is located at the position P1, the time period from when shifting of the phase $\phi_{12}$ is started to when the peak value Pb1 is reached is equal to t1, which is a value different from the time t0 determined when the target object 21 is located at the position P0.

As described above, the first phase difference $\Delta\phi_{10}$ is successfully identified on the basis of the time t0. To identify the first phase difference $\Delta\phi_{10}$, for example, a speed at which the phase $\phi_{12}$ is shifted may be determined in advance to allow the measurement apparatus 2 and the target object 21 to obtain a correlation. Consequently, since the phase difference $\Delta\phi_{10}$ in Equation 1 is successfully identified, the direction $\theta$ of the target object 21 is successfully determined on the basis of Equation 1. Thus, the signal processing circuit 24 of the target object 21 calculates the first phase difference $\Delta\phi_{10}$ by processing the reception signal $Sr_1$ and outputs the information $D\phi$ based on the first phase difference $\Delta\phi_{10}$.

Note that since the phase difference $\Delta\phi_{10}$ is repeated every time the distance difference $\Delta r_1$ between the distances between the target-side antenna 22 and the two antenna elements $3_2$ and $3_2$ changes by one wavelength $\lambda$, a plurality of directions $\theta$ may be determined using only the information $D\phi$ regarding the first phase difference $\Delta\phi_{10}$. Regarding this point, the direction $\theta$ is uniquely determined by referring to the direction $\theta$ detected using the second antenna pair 4 as described later.

Then in step 4, it is determined whether a predetermined time period has passed since shifting of the phase $\phi_{12}$ of the second transmission signal $St_{12}$ has been started. Here, the predetermined time period can be set to a time period greater than or equal to one period of the beat waveform of the reception signal $Sr_1$, for example, to allow the target object 21 to detect the first phase difference $\Delta\phi_{10}$. If "NO" is determined in step 4, the predetermined time period has not passed. Thus, the process returns to step 4 again, and the process is kept waited until the predetermined time period passes.

On the other hand, if "YES" is determined in step 4, that is, if the predetermined time period has passed, the process proceeds to step 5, in which the return signal Sp is transmitted from the target object 21 to the measurement apparatus 2 to return the information $D\phi$ processed by the signal processing circuit 24. In this way, the target object 21 transmits the information $D\phi$ processed by the signal processing circuit 24 to the measurement apparatus 2 with a predetermined delay.

In step 6, the measurement apparatus 2 determines a first distance D1 on the basis of a time period from when shifting of the phase $\phi_{12}$ of the second transmission signal $St_{12}$ is started to when the information $D\phi$ returned from the target object 21 is received by the measurement apparatus 2. That is, a round-trip time of the signals is successfully determined on the basis of a time period taken for all the steps from when shifting of the phase $\phi_{12}$ of the second transmission signal $St_{12}$ is started to when the information $D\phi$ is returned, by subtracting the predetermined time taken by the target object 21. If the propagation speed of the signal is determined in advance, the first distance D1 between the measurement apparatus 2 and the target object 21 is successfully determined from the round-trip time. Note that the time point at which the time measurement is started is not limited to the time point at which shifting of the phase $\phi_{12}$ of the second transmission signal $St_{12}$ is started and may be, for example, a time point at which transmission of the transmission signals $St_{11}$ and $St_{12}$ is started or a time point at which a trigger signal added to the transmission signals $St_{11}$ and $St_{12}$ is output, as long as the propagation time period of the transmission signals $St_{11}$ and $St_{12}$ and the return signal Sp is measurable.

Then in step S7, the operation of the first antenna pair 3 is ended, and the operation of the second antenna pair 4 is started. Specifically, as in step 1, the first and second transmission signals $St_{21}$ and $St_{22}$ are respectively transmitted from the first and second antenna elements $4_1$ and $4_2$ of the second antenna pair 4. That is, the operation of the first antenna pair 3 is switched to the operation of the second antenna pair 4. At that time, both of the first transmission signal $St_{21}$ output form the first antenna element $4_1$ and the second transmission signal $St_{22}$ output from the second antenna element $4_2$ are configured to have the carrier frequency f and to be in phase, just like the first and second transmission signals $St_{11}$ and $St_{12}$ for the first antenna pair 3.

Then in step 8, as in step 2, the second transmission signal $St_{22}$ is output while the phase $\phi_{22}$ thereof is being shifted. In this case, as in the case of the first antenna pair 3, the phase difference $\Delta\phi_2$ between the phase $\phi_{21}$ of the first transmission signal $St_{21}$ and the phase $\phi_{22}$ of the second transmission signal $St_{22}$ changes over time t ($\Delta\phi_2=\Delta\phi_2(t)$).

Then in step 9, the target object 21 detects the second phase difference $\Delta\phi_{20}$ on the basis of the first transmission signal $St_{21}$ and the second transmission signal $St_{22}$. The second phase difference $\Delta\phi_{20}$ is based on the distance difference $\Delta r_2$ between distances from the antenna elements $4_1$ and $4_2$ to the target object 21. As illustrated in FIG. 4, $L_2$ denotes the space between the antenna elements $4_1$ and $4_2$, $\theta$ denotes the direction of the target object 21 with respect to the reference direction, and $\lambda$ denotes the wavelength at the carrier frequency f. Then, a relationship between the second phase difference $\Delta\phi_{20}$ and the distance difference $\Delta r_2$ (path difference) between the distances from the antenna elements $4_1$ and $4_2$ to the target object 21 (the target-side antenna 22) is denoted by Equation 3 below, which is substantially the same as in Equation 1. For example, suppose that the space $L_2$ is 27 cm, the carrier frequency f is 5 GHz, and the wavelength $\lambda$ is 6 cm. In this case, the second phase difference $\Delta\phi_{20}$ is denoted by Equation 4 below. In this case, as illustrated in FIG. 5, every time the direction $\theta$ of the target object 21 changes by approximately 12.8 degrees, the second phase difference $\Delta\phi_{20}$ between the phases of the transmission signal $St_{21}$ for the first antenna element $4_1$ and the transmission signal $St_{22}$ for the second antenna element $4_2$ changes by $2\pi$.

$$\Delta\phi_{20} = \frac{2\pi \Delta r_2}{\lambda} = \frac{2\pi L_2 \sin\theta}{\lambda} \quad \text{[Math. 3]}$$

$$\Delta\phi_{20} = 2\pi \cdot 4.5 \cdot \sin\theta \quad \text{[Math. 4]}$$

On the other hand, the phase difference $\Delta\phi_2$ between the phases of the two transmission signals $St_{21}$ and $St_{22}$ changes over time. The second phase difference $\Delta\phi_{20}$ is successfully identified by measuring a time period from when shifting of the phase $\phi_{22}$ is started to when the signal power becomes the largest, if a speed at which the phase $\phi_{22}$ of the second transmission signal $St_{22}$ is shifted may be determined in advance to allow the measurement apparatus 2 and the target object 21 to obtain a correlation, for example. Consequently, since the phase difference $\Delta\phi_{20}$ in Equation 3 is successfully identified, the direction $\theta$ of the target object 21 is successfully determined on the basis of Equation 3. Thus, the signal processing circuit 24 of the target object 21 calculates the second phase difference $\Delta\phi_{20}$ by processing the reception signal $Sr_2$ and outputs the information $D\phi$ based on the second phase difference $\Delta\phi_{20}$.

However, since the phase difference $\Delta\phi_{20}$ is repeated every time the distance difference $\Delta r_2$ between the distances between the target-side antenna 22 and the two antenna elements $4_1$ and $4_2$ changes by one wavelength $\lambda$, a plurality of directions $\theta$ may be determined by using only the information $D\phi$ regarding the second phase difference $\Delta\phi_{20}$. This point is the same as the case of determining the direction $\theta$ by using the first phase difference $\Delta\phi_{10}$, and the direction $\theta$ is uniquely determined in step 13 described later.

Then in step 10, it is determined whether a predetermined time period has passed since shifting of the phase $\phi_{22}$ of the second transmission signal $St_{22}$ has been started. Here, the predetermined time period can be set to a time period greater than or equal to one period of the beat waveform of the reception signal $Sr_2$, for example, to allow the target object 21 to detect the second phase difference $\Delta\phi_{20}$ as in step 4. If "NO" is determined in step 10, the predetermined time period has not passed. Thus, the process returns to step 10 again, and the process is kept waited until the predetermined time period passes.

On the other hand, if "YES" is determined in step 10, that is, when the predetermined time period has passed, the process proceeds to step 11, in which the information $D\phi$ processed by the signal processing circuit 24 is returned from the target object 21 to the measurement apparatus 2.

In step 12, as in step 6, the measurement apparatus 2 determines a second distance D2 on the basis of a time period from when shifting of the phase $\phi_{22}$ of the second transmission signal $St_{22}$ is started to when the information $D\phi$ returned from the target object 21 is received by the measurement apparatus 2.

Then in step 13, the direction $\theta$ of the target object 21 is identified on the basis of the first phase difference $\Delta\phi_{10}$ determined in step 3 and the second phase difference $\Delta\phi_{20}$ determined in step 9. At that time, the first phase difference $\Delta\phi_{10}$ for the first antenna pair 3 and the second phase difference $\Delta\phi_{20}$ for the second antenna pair 4 have different degrees of change, i.e., 11.5 degrees and 12.8 degrees, for the direction $\theta$ of the target object 21. For this reason, even when the phase difference $\Delta\phi_{10}$ is equal to $2n\pi$ ($\Delta\phi_{10}=0$), where n is an integer, for example, the other phase difference $\Delta\phi_{20}$ is not equal to $2n\pi$. Thus, how many times the phase difference $\Delta\phi_{10}$ has been repeated is successfully determined. Specifically, the detection circuit 15 of the measurement apparatus 2 successfully detects the direction $\theta$ of the target object 21 from the measurement apparatus 2 by detecting the matching direction $\theta$ from among the candidate directions θ determined based on the first phase difference $\Delta\phi_{10}$ and the second phase difference $\Delta\phi_{20}$.

Then in step 14, the distance from the measurement apparatus 2 to the target object 21 is determined on the basis of the first distance D1 determined in step 6 and the second distance D2 determined in step 12. In this case, a distance containing less error is successfully obtained by determining the distance from the measurement apparatus 2 to the target object 21 on the basis of the average of the first distance D1 and the second distance D2, for example. If the target object 21 moves, only the second distance D2 may be used to identify the latest distance from the measurement apparatus 2 to the target object 21, for example.

As described above, in accordance with the first embodiment, the positioning system 1 includes the measurement apparatus 2 including the first antenna pair 3 and the second antenna pair 4, and the target object 21 including the signal processing circuit 24 that processes the reception signals $Sr_1$ and $Sr_2$. The transmission signals $St_{11}$ and $St_{12}$ different from each other are respectively output from the two antenna elements $3_1$ and $3_2$ of the first antenna pair. The target-side antenna 22 receives the reception signal $Sr_1$ in which these two transmission signals $St_{11}$ and $St_{12}$ are combined together. In such case, if the transmission signals $St_{11}$ and $St_{12}$ whose the phase difference $\Delta\phi_1$ changes over time are respectively output from the two antenna elements $3_1$ and $3_2$ of the first antenna pair 3, such transmission signals cause the reception signal $Sr_1$ to beat. Accordingly, the target object 21 detects, by using the signal processing circuit 24, the first phase difference $\Delta\phi_{10}$ caused between the target-side antenna 22 and the two antenna elements $3_1$ and $3_2$ on the basis of this beat, and returns, by using the transmission circuit 23C, the information $D\phi$ regarding the first phase difference $\Delta\phi_{10}$ to the measurement apparatus 2. In this way, the measurement apparatus 2 successfully detects the direction θ of the target object 21 on the basis of the information $D\phi$ regarding the first phase difference $\Delta\phi_{10}$.

However, since the phase difference $\Delta\phi_{10}$ is repeated every time the distance difference $\Delta r_1$ between distances of the target-side antenna 22 and the two antenna elements $3_1$ and $3_2$ changes by one wavelength λ, a plurality of directions θ may be determined using only the information $D\phi$ regarding the first phase difference $\Delta\phi_{10}$. Accordingly, when the angle range in which the direction θ of the target object 21 is large, the direction θ cannot be determined uniquely using only the information $D\phi$ regarding the first phase difference $\Delta\phi_{10}$.

However, in the positioning system 1, the space $L_1$ between the two antenna elements $3_1$ and $3_2$ of the first antenna pair 3 and the space $L_2$ between the two antenna elements $4_1$ and $4_2$ of the second antenna pair 4 are set to distances different from each other. This configuration makes the first and second phase differences $\Delta\phi_{10}$ and $\Delta\phi_{20}$ caused for the antenna pairs 3 and 4 to be different for the first antenna pair 3 and the second antenna pair 4. As a result, the direction θ of the target object 21 is successfully determined uniquely on the basis of the first phase difference $\Delta\phi_{10}$ determined using the first antenna pair 3 and the second phase difference $\Delta\phi_{20}$ determined using the second antenna pair 4.

In addition, the target object 21 transmits the information $D\phi$ processed by the signal processing circuit 24 to the measurement apparatus 2 with a predetermined delay. With this configuration, a time period from when the two transmission signals $St_{11}$ and $St_{12}$ transmitted from the first antenna pair 3 of the measurement apparatus 2 are received by the target-side antenna 22 to when the information $D\phi$ regarding the first phase difference $\Delta\phi_{10}$ processed by the signal processing circuit 24 is returned to the measurement apparatus 2 can be made substantially constant. Thus, the measurement apparatus 2 measures a time period from when the two transmission signals $St_{11}$ and $St_{12}$ are transmitted to when the predetermined information $D\phi$ is returned from the target object 21, and subtracts the time period taken by the target object 21 from this time period. In this way, a propagation time period taken for the signals to propagate between the measurement apparatus 2 and the target object 21 can be determined, and ultimately the distance from the measurement apparatus 2 to the target object 21 can be determined on the basis of this propagation time period. In addition, the distance from the measurement apparatus 2 to the target object 21 can be measured by using the second antenna pair 4 by operating the second antenna pair 4 in a manner similar to that of the first antenna pair 3.

Further, since the first and second antenna pairs 3 and 4 of the measurement apparatus 2 alternately operate in terms of time, the first and second antenna pairs 3 and 4 need not be synchronized with each other. In this case, the configuration of the measurement apparatus 2 can be simplified since the RF circuit that alternately radiate an electrical wave in the first and second system as in the related art can be omitted.

In addition, the first and second antenna pairs 3 and 4 can be disposed closely to each other as long as the space $L_1$ between the two antenna elements $3_1$ and $3_2$ of the first antenna pair 3 and the space $L_2$ between the two antenna elements $4_1$ and $4_2$ of the second antenna pair 4 are set to distances different from each other. Thus, there is no need to install two systems at different positions as in the related art, and the measurement apparatus 2 can be easily installed.

The target object 21 returns the information $D\phi$ regarding the phase difference $\Delta\phi_{10}$ ($\Delta\phi_{20}$) after detecting the phase difference $\Delta\phi_{10}$ ($\Delta\phi_{20}$) based on the two transmission signals $St_{11}$ and $St_{12}$ ($St_{21}$ and $St_{22}$) both in the case where the first antenna pair 3 is used and in the case where the second antenna pair 4 is used. Thus, there is no need to perform different signal processing for the first and second antenna pairs 3 and 4, and consequently the configuration of the target object 21 can be simplified and the dimensions and the weight of the target object 21 can be decreased. In this case, the target object 21 does not detect the position thereof; instead, the measurement apparatus 2 to which the information $D\phi$ is transmitted from the target object 21 detects the position of the target object 21. As a result, the target object 21 can be made smaller and lighter and can be installed at various places, compared with the GPS system in which the target object detects the position thereof, for example.

In addition, the signal generation circuit 5 of the positioning system 1 includes the oscillator 6 and the phase shifters $8_1$, $8_2$, $11_1$, and $11_2$. With this configuration, the phase of the signal output by the oscillator 6 can be changed by the phase shifters $8_1$, $8_2$, $11_1$, and $11_2$. Accordingly, the positioning system 1 can have a simpler circuit configuration.

Further, since the amount of change in the first phase difference $\Delta\phi 10$ for the direction θ of the target object 21 can be increased, for example, by setting the space $L_1$ between the antenna element $3_1$ and $3_2$ of the first antenna pair 3 to be larger than the wavelength λ at the carrier frequency f, the resolution of detecting the position of the target object 21 can be increased. In this case, the angle range of the direction θ corresponding to the change in the first phase difference $\Delta\phi_{10}$ by one wavelength λ decreases, and many directions are detected as the direction of the target object 21 on the basis of the first phase difference $\Delta\phi_{10}$. However, since the positioning system 1 includes the second antenna pair 4 including the antenna elements $4_1$ and $4_2$ spaced apart by the space $L_2$ different from the space $L_1$, the direction for which the angles detected using the first and second antenna pairs 3 and 4 are equal can be uniquely identified as the direction in which the target object 21 is located. The advantageous effects described above are similarly obtained when the space $L_2$ between the antenna elements $4_1$ and $4_2$ of the second antenna pair 4 is set to be larger than the wavelength $\lambda$ at the carrier frequency f.

Figure 8:
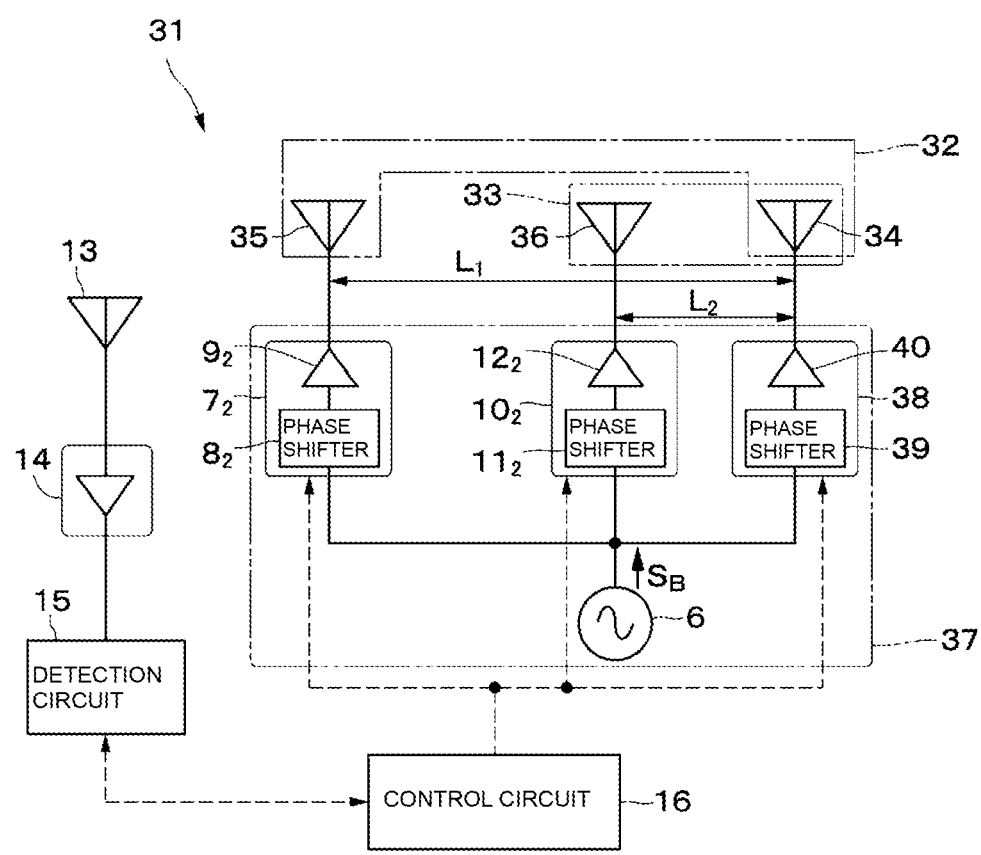
FIG. 8 is a circuit diagram illustrating an overall configuration of a measurement apparatus of a positioning system according to a second embodiment.

FIG. 8 illustrates a positioning system according to a second embodiment of the present disclosure. The feature of the second embodiment is that the first antenna pair and the second antenna pair share one of antenna elements thereof in the measurement apparatus. In the second embodiment, a configuration substantially the same as that of the first embodiment described above is assigned the same reference sign and the description thereof is omitted.

A measurement apparatus 31 according to the second embodiment is configured substantially in the same manner as the measurement apparatus 2 according to the first embodiment. Accordingly, the measurement apparatus 31 includes a first antenna pair 32, a second antenna pair 33, and a signal generation circuit 37 that generates the transmission signals $St_{11}$, $St_{12}$, $St_{21}$, and $St_{21}$. However, the first antenna pair 32 and the second antenna pair 33 include an antenna element 34 in common. This point is different from the first embodiment. Accordingly, the first antenna pair 32 includes the common antenna element 34 and an independent antenna element 35. The second antenna pair 33 includes the common antenna element 34 and an independent antenna element 36.

Each of the antenna elements 34, 35, and 36 is connected to the signal generation circuit 37. The antenna elements 34, 35, and 35 are configured substantially in the same manner as the antenna elements $3_1$, $3_2$, $4_1$, and $4_2$ according to the first embodiment. As illustrated in FIG. 8, the first antenna element 34 and the second antenna element 35 are spaced apart by the space $L_1$ in the first antenna pair 32. On the other hand, the first antenna element 34 and the second antenna element 36 are spaced apart by the space $L_2$ in the second antenna pair 33. In this case, the first antenna pair 32 and the second antenna element 33 share the first antenna element 34, which is one of the antenna elements thereof.

The first antenna element 34 is connected to a modulation circuit 38 described later. The second antenna element 35 is connected to the modulation circuit $7_2$. With this configuration, the antenna elements 34 and 35 of the first antenna pair 32 radiate the transmission signals $St_{11}$ and $St_{12}$ that are different from each other and have phases modulated by the modulation circuits 38 and $7_2$, respectively. In addition, the second antenna element 36 is connected to the modulation circuit $10_2$. With this configuration, the antenna elements 34 and 36 of the second antenna pair 33 radiate the transmission signals $St_{21}$ and $St_{22}$ that are different from each other and have phases modulated by the modulation circuits 38 and $10_2$, respectively.

Note that the antenna elements 34, 35, and 36 are not limited to those arranged in a straight line and may be arranged in a curved line. In addition, the antenna elements 34, 35, and 36 may be arranged in an L shape such that the antenna element 34 is located at the bent portion. Further, the antenna element 34 shared by the first antenna pair 32 and the second antenna pair 33 is not limited to the antenna element 34 located at an end portion among the three antenna elements 34, 35, and 36 arranged in a straight line and may be the antenna element 34 located in the middle. However, in view of simplification of signal processing performed by the target object 21, the positional relationship between the first antenna element 34 and the second antenna element 35 of the first antenna pair 32 can be identical to the positional relationship between the first antenna element 34 and the second antenna element 36 of the second antenna pair 33.

The signal generation circuit 37 includes the oscillator 6 and the modulation circuits 38, $7_2$, and $10_2$. The oscillator 6 outputs, to the antenna elements 34, 35, and 36, the reference signal $S_B$ (carrier wave) that serves as a reference of the transmission signals $St_{11}$ ($St_{21}$), $St_{12}$, and $St_{22}$.

The modulation circuit 38 is connected to the common antenna element 34 and controls the phase and amplitude of the transmission signals $St_{11}$ and $St_{21}$. The modulation circuit 38 is configured substantially in the same manner as the modulation circuits $7_1$ and $10_1$ according to the first embodiment. Thus, the modulation circuit 38 includes a phase shifter 39 that is substantially the same as the phase shifters $8_1$ and $11_1$ and an amplifier 40 that is substantially the same as the amplifiers $9_1$ and $12_1$.

When the first antenna pair 32 radiates the transmission signals $St_{11}$ and $St_{12}$, the phase shifters 39 and $8_2$ operate substantially in the same manner as the phase shifters $8_1$ and $8_2$ according to the first embodiment. Accordingly, the phase shifters 39 and $8_2$ perform, independently for the antenna elements 34 and 35, phase modulation on the reference signal $S_B$ output from the oscillator 6 and generate the transmission signals $St_{11}$ and $St_{12}$ having the phases $\phi_{12}$ and $\phi_{11}$ as a result of modulation, respectively. At that time, the phase shifter 39 outputs the reference signal $S_B$ without necessarily changing the phase thereof. In contrast, the second transmission signal $St_{12}$ output from the second antenna element 35 is configured to have a carrier frequency f identical to that of the first transmission signal $St_{11}$ and have a phase slightly shifted in every predetermined time period. That is, the phase difference $\Delta\phi_1$ ($\Delta\phi_1=\phi_{11}-\phi_{12}$) between the phase $\phi_{11}$ of the first transmission signal $St_{11}$ and the phase $\phi_{12}$ of the second transmission signal $St_{12}$ changes over time t ($\Delta\phi_1=\Delta\phi_1(t)$). At that time, the range over which the phase difference $\Delta\phi_1$ changes is set to be greater than or equal to at least $2\pi$.

When the second antenna pair 33 radiates the transmission signals $St_{21}$ and $St_{22}$, the phase shifters 39 and $11_2$ operate substantially in the same manner as the phase shifters $8_1$ and $11_1$ according to the first embodiment. Accordingly, the phase shifters 39 and $11_2$ perform, independently for the antenna elements 34 and 36, phase modulation on the reference signal $S_B$ output from the oscillator 6 and generate the transmission signals $St_{21}$ and $St_{22}$ having the phases $\phi_{21}$ and $\phi_{22}$ as a result of modulation, respectively. At that time, the phase shifter 39 outputs the reference signal $S_B$ without necessarily changing the phase thereof. In contrast, the second transmission signal $St_{22}$ output from the second antenna element 36 is configured to have a carrier frequency f identical to that of the first transmission signal $St_{21}$ and have a phase slightly shifted in every predetermined time period. That is, the phase difference $\Delta\phi_2$ ($\Delta\phi_2=\phi_{21}-\phi_{22}$) between the phase $\phi_{21}$ of the first transmission signal $St_{21}$ and the phase $\phi_{22}$ of the second transmission signal $St_{22}$ changes over time t ($\Delta\phi_2=\Delta\phi_2(t)$). At that time, the range over which the phase difference $\Delta\phi_2$ changes is set to be greater than or equal to at least $2\pi$.

When the first antenna pair 32 radiates the transmission signals $St_{11}$ and $St_{12}$, the gain of the amplifiers 40 and $9_2$ is increased and the gain of the amplifier $12_2$ is decreased. In this way, when the first antenna pair 32 radiates the transmission signals $St_{11}$ and $St_{12}$, radiation of the transmission signal $St_{22}$ from the antenna element 36 can be stopped.

On the other hand, when the second antenna pair 33 radiates the transmission signals $St_{21}$ and $St_{22}$, the gain of the amplifiers 40 and $12_2$ is increased and the gain of the amplifiers $9_2$ is decreased. In this way, when the second antenna pair 33 radiates the transmission signals $St_{21}$ and $St_{22}$, radiation of the transmission signal $St_{12}$ from the antenna element 35 can be stopped.

As described above, advantageous effects substantially the same as those of the first embodiment can be obtained also in the second embodiment. In the second embodiment, the first antenna element 32 and the second antenna element 33 share the first antenna element 34. With this configuration, the number of antenna elements can be reduced and the smaller measurement apparatus 31 can be implemented.

Figure 9:
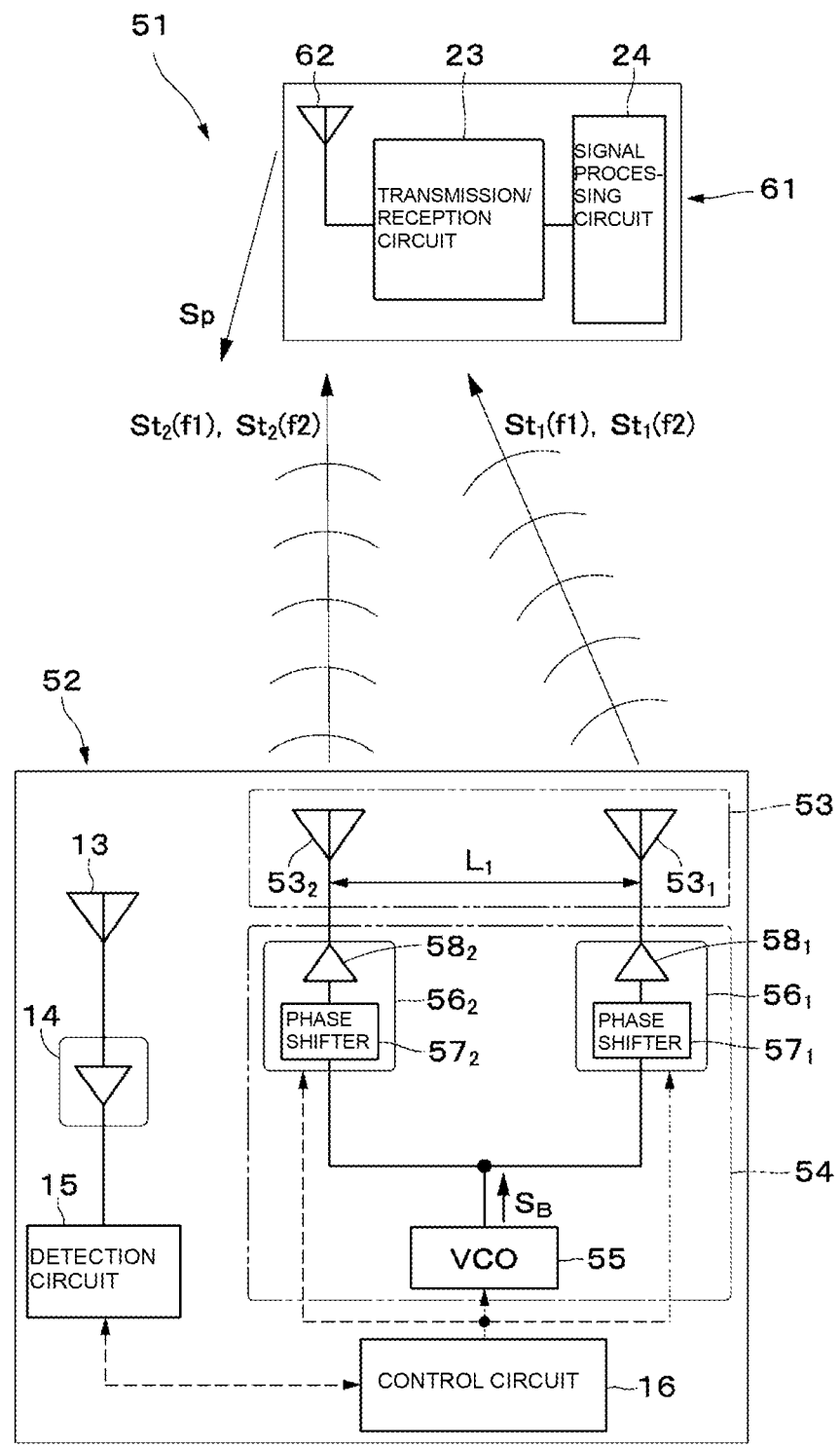
FIG. 9 is a circuit diagram illustrating an overall configuration of a positioning system according to a third embodiment.
Figure 10:
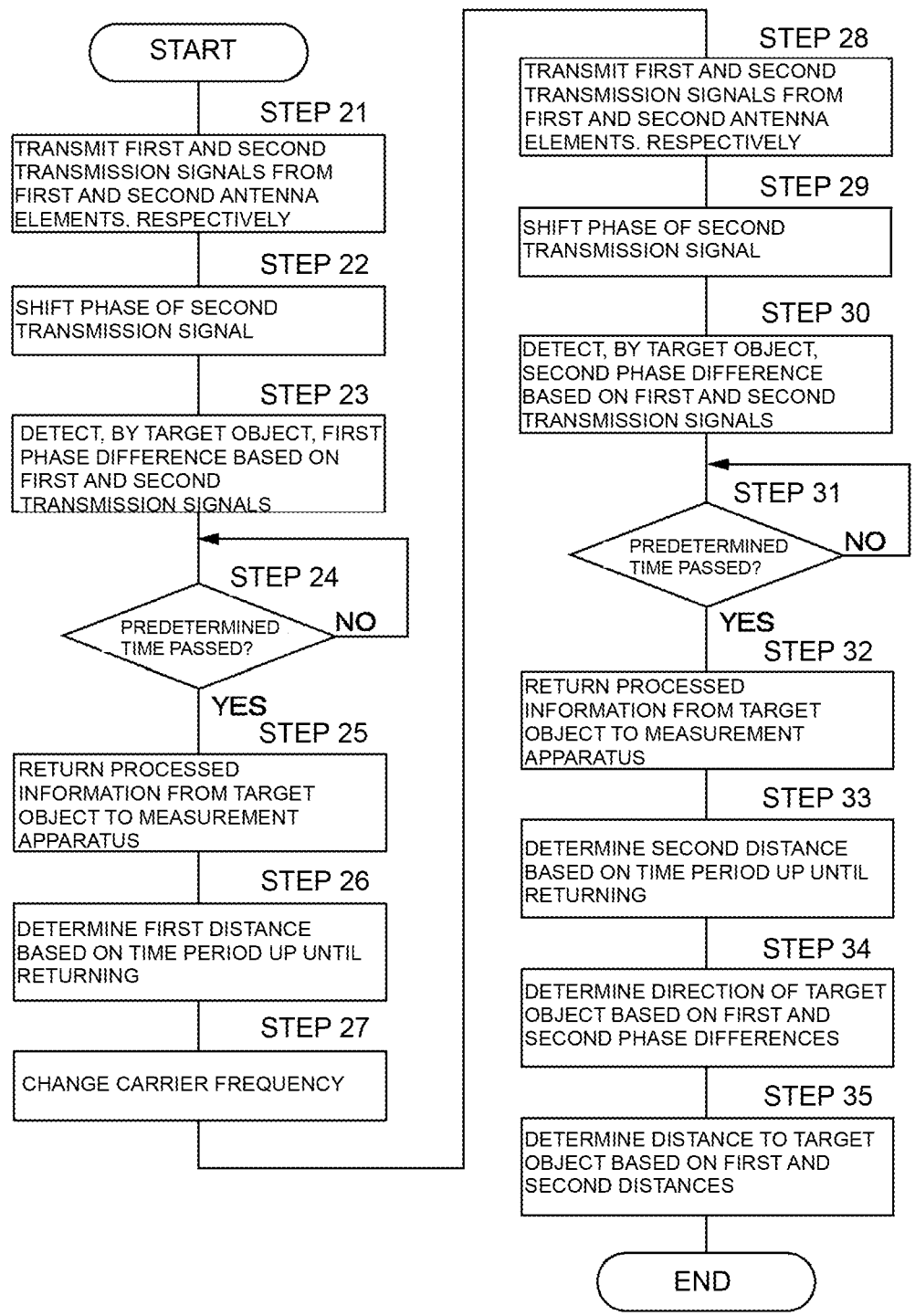
FIG. 10 is a flowchart illustrating overall processing of the positioning system according to the third embodiment.

Now, FIG. 9 and FIG. 10 illustrate a positioning system according to a third embodiment of the present disclosure. The feature of the third embodiment is that transmission signals are radiated from a single antenna pair while the frequency of the transmission signals being swept. In the third embodiment, a configuration substantially the same as that of the first embodiment described above is assigned the same reference sign and the description thereof is omitted.

A positioning system 51 according to the third embodiment is configured substantially in the same manner as the positioning system 1 according to the first embodiment. The positioning system 51 includes a measurement apparatus 52 and a target object 61, for example.

The measurement apparatus 52 according to the third embodiment includes an antenna pair 53 including antenna elements $53_1$ and $53_2$ and a signal generation circuit 54 that generates transmission signals $St_1(f)$ and $St_2(f)$ respectively output from the antenna element $53_1$ and $53_2$. Each of the antenna elements $53_1$ and $53_2$ is connected to the signal generation circuit 54.

The antenna elements $53_1$ and $53_2$ are configured substantially in the same manner as the antenna elements $3_1$ and $3_2$ according to the first embodiment. As illustrated in FIG. 9, in the antenna pair 53, the first antenna element $53_1$ and the second antenna element $53_2$ are spaced apart by the space $L_1$.

The antenna elements $53_1$ and $53_2$ are respectively connected to modulation circuits $56_1$ and $56_2$ described later. The antenna elements $53_1$ and $53_2$ radiate the transmission signals $St_1(f)$ and $St_2(f)$ that are different from each other and have phases modulated by the modulation circuits $56_1$ and $56_2$, respectively.

The signal generation circuit 54 includes a voltage-controlled oscillator (VCO) 55 and the modulation circuits $56_1$ and $56_2$. The voltage-controlled oscillator 55 outputs, to the antenna elements $53_1$ and $53_2$, a reference signal $S_B$ (carrier wave) that serves as a reference of the transmission signals $St_1(f)$ and $St_2(f)$. The voltage-controlled oscillator 55 is connected to the control circuit 16 and is capable of changing the carrier frequency f of the reference signal $S_B$ as a result of adjustment of the control voltage. With this configuration, the antenna pair 53 is capable of outputting a plurality of different kinds of transmission signals $St_1(f1)$, $St_2(f1)$, $St_1(f2)$ and $St_2(f2)$ having carrier frequencies f1 and f2.

The modulation circuits $56_1$ and $56_2$ are respectively connected to the antenna elements $53_1$ and $53_2$ of the antenna pair 53. The modulation circuits $56_1$ and $56_2$ respectively control the phase and amplitude of the transmission signals $St_1(f)$ and $St_2(f)$. The modulation circuit $56_1$ and $56_2$ are configured substantially in the same manner as the modulation circuits $7_1$ and $7_2$ according to the first embodiment. Accordingly, the modulation circuits $56_1$ and $56_2$ include phase shifters $57_1$ and $57_2$ that are substantially the same as the phase shifters $8_1$ and $8_2$ and amplifiers $58_1$ and $58_2$ that are substantially the same as the amplifiers $9_1$ and $9_2$, respectively.

The phase shifters $57_1$ and $57_2$ perform, independently for the antenna elements $53_1$ and $53_2$, phase modulation on the reference signal $S_B$ output from the voltage-controlled oscillator 55 and generate the transmission signals $St_1(f)$ and $St_2(f)$ having phases $\phi_1$ and $\phi_2$ as a result of modulation, respectively. At that time, the phase shifter $57_1$ outputs the reference signal $S_B$ without necessarily shifting the phase thereof. In contrast, the second transmission signal $St_2(f)$ output from the second antenna element $53_2$ is configured to have the carrier frequency f identical to that of the first transmission signal $St_1(f)$ and have a phase slightly shifted in every predetermined time period.

Accordingly, when the reference signal $S_B$ having the carrier frequency f1 is output from the voltage-controlled oscillator 55, the phase difference $\Delta\phi(f1)$ ($\Delta\phi(f1)=\phi_1(f1)-\phi_2(f1)$) between the phase $\phi_1(f1)$ of the first transmission signal $St_1(f1)$ and the phase $\phi_2(f1)$ of the second transmission signal $St_2(f1)$ changes over time t ($\Delta\phi(f1)=\Delta\phi(t)$). At that time, the range over which the phase difference $\Delta\phi(f1)$ changes is set to be greater than or equal to at least $2\pi$.

Likewise, when the reference signal $S_B$ having the carrier frequency f2 is output from the voltage-controlled oscillator 55, the phase difference $\Delta\phi(f2)$ ($\Delta\phi(f2)=\phi_1(f2)-\phi_2(f2)$) between the phase $\phi_1(f2)$ of the first transmission signal $St_1(f2)$ and the phase $\phi_2(f2)$ of the second transmission signal $St_2(f2)$ changes over time t ($\Delta\phi(f2)=\Delta\phi(t)$). At that time, the range over which the phase difference $\Delta\phi(f2)$ changes is set to be greater than or equal to at least $2\pi$.

The amplifiers $58_1$ and $58_2$ respectively amplify the power of the transmission signals $St_1(f)$ and $St_2(f)$ radiated from the antenna elements $53_1$ and $53_2$ to levels at which the target object 61 is detectable.

The target object 61 is configured substantially in the same manner as the target object 21 according to the first embodiment. Accordingly, the target object 61 includes a target-side antenna 62, the transmission/reception circuit 23, and the signal processing circuit 24. The target-side antenna 62 according to the third embodiment is configured in a manner similar to the target-side antenna 22 according to the first embodiment. However, the target-side antenna 62 differs from the target-side antenna 22 according to the first embodiment in that the target-side antenna 62 is capable of receiving the plurality of kinds of transmission signals $St_1(f)$ and $St_2(f)$ having different carrier frequencies f.

For example, when the transmission signals $St_1(f1)$ and $St_2(f1)$ having the carrier frequency f1 are radiated from the antenna pair 53, the target-side antenna 62 simultaneously receives the transmission signals $St_1(f1)$ and $St_2(f1)$ and outputs to the transmission/reception circuit 23 the reception signal $Sr_1$ in which these transmission signals $St_1(f1)$ and $St_2(f1)$ are combined together. At that time, the signal processing circuit 24 processes the reception signal $Sr_1$ received by the target-side antenna 62 and measures the first phase difference $\Delta\phi_{10}$ caused between the target-side antenna 62 and the antenna elements $53_1$ and $53_2$. The signal processing circuit 24 outputs, as the information D$\phi$, the detected first phase difference $\Delta\phi_{10}$ to the target-side antenna 62 via the transmission circuit 23C.

In addition, when the transmission signals $St_1(f2)$ and $St_2(f2)$ having the carrier frequency f2 are radiated from the antenna pair 53, the target-side antenna 62 simultaneously receives the transmission signals $St_1(f2)$ and $St_2(f2)$ and outputs to the transmission/reception circuit 23 the reception signal $Sr_2$ in which these transmission signals $St_1(f2)$ and $St_2(f2)$ are combined together. At that time, the signal processing circuit 24 processes the reception signal $Sr_2$ received by the target-side antenna 62 and measures the second phase difference $\Delta\phi_{20}$ caused between the target-side antenna 62 and the antenna elements $53_1$ and $53_2$. The signal processing circuit 24 outputs, as the information $D\phi$, the detected second phase difference $\Delta\phi_{20}$ to the target-side antenna 62 via the transmission circuit 23C.

An operation of the positioning system 51 according to this embodiment will be described next by using FIG. 10.

First in step 21, the operation of the antenna pair 53 is started. At that time, the voltage-controlled oscillator 55 outputs the reference signal $S_B$ having the carrier frequency f1. Thus, the first and second antenna elements $53_1$ and $53_2$ of the antenna pair 53 respectively transmit the first and second transmission signals $St_1(f1)$ and $St_2(f1)$. At that time, the first transmission signal $St_1(f1)$ and the second transmission signal $St_2(f1)$ are configured to be in phase.

Then in step 22, the second transmission signal $St_2(f1)$ is output while the phase $\phi_2(f1)$ thereof is being shifted. In this case, the phase difference $\Delta\phi(f1)$ between the phase $\phi_1(f1)$ of the first transmission signal $St_1(f1)$ and the phase $\phi_2(f1)$ of the second transmission signal $St_2(f1)$ changes over time t ($\Delta\phi(f1)=\Delta\phi(t)$).

Then in step 23, the target object 61 detects the first phase difference $\Delta\phi_{10}$ on the basis of the first transmission signal $St_1(f1)$ and the second transmission signal $St_2(f1)$. The first phase difference $\Delta\phi_{10}$ is based on the distance difference $\Delta r_1$ between distances from the antenna elements $53_1$ and $53_2$ to the target object 61 and the carrier frequency f1. A method for detecting the first phase difference $\Delta\phi_{10}$ is substantially the same as that of the first embodiment described above.

For example, suppose that the space $L_1$ between the antenna elements $53_1$ and $53_2$ is 30 cm, the direction of the target object 61 with respect to the reference direction is θ, the carrier frequency f1 is 5 GHz, and the wavelength λ1 is 6 cm. Then, the relationship between the first phase difference $\Delta\phi_{10}$ and the distance difference $\Delta r_1$ (path difference) between distances from the antenna elements $53_1$ and $53_2$ to the target object 61 (the target-side antenna 62) is denoted by Equation 5 below. In this case, every time the direction θ of the target object 61 changes by approximately 11.5 degrees, the first phase difference $\Delta\phi_{10}$ between the phases of the first transmission signal $St_1(f1)$ and the second transmission signal $St_2(f1)$ changes by 2π as in the first embodiment.

$$\Delta\phi_{10} = \frac{2\pi \Delta r_1}{\lambda 1} = \frac{2\pi L_1 \sin\theta}{\lambda 1} = 2\pi \cdot 5 \cdot \sin\theta \qquad \text{[Math. 5]}$$

Then in step 24, it is determined whether a predetermined time period has passed since shifting of the phase $\phi_2(f1)$ of the second transmission signal $St_2(f1)$ has been started. If "NO" is determined in step 24, the predetermined time period has not passed. Thus, the process returns to step 24 again, and the process is kept waited until the predetermined time period passes.

On the other hand, if "YES" is determined in step 24, that is, when the predetermined time period has passed, the process proceeds to step 25, in which the return signal Sp is transmitted from the target object 61 to the measurement apparatus 52 to return the information $D\phi$ processed by the signal processing circuit 24.

In step 26, the measurement apparatus 52 determines the first distance D1 on the basis of a time period from when shifting of the phase $\phi_2(f1)$ of the second transmission signal $St_2(f1)$ is started to when the information $D\phi$ returned from the target object 61 is received by the measurement apparatus 52.

Then in step 27, the operation of the antenna pair 53 is ended. The voltage-controlled oscillator 55 changes the carrier frequency f1 of the reference signal $S_B$ to the carrier frequency f2 that is a different value.

The in step 28, the operation of the antenna pair 53 is started using the carrier frequency f2. Specifically, as in step 21, the first and second transmission signals $St_1(f2)$ and $St_2(f2)$ are respectively transmitted from the first and second antenna elements $53_1$ and $53_2$ of the antenna pair 53. At that time, the first transmission signal $St_1(f2)$ and the second transmission signal $St_2(f2)$ are configured to be in phase.

Then in step 29, as in step 22, the second transmission signal $St_2(f2)$ is output while the phase $\phi_2(f2)$ thereof is being shifted. In this case, the phase difference $\Delta\phi(f2)$ between the phase $\phi_1(f2)$ of the first transmission signal $St_1(f2)$ and the phase $\phi_2(f2)$ of the second transmission signal $St_2(f2)$ changes over time t ($\Delta\phi(f2)=\Delta\phi(t)$).

Then in step 30, the target object 61 detects the second phase difference $\Delta\phi_{20}$ on the basis of the first transmission signal $St_1(f2)$ and the second transmission signal $St_2(f2)$. The second phase difference $\Delta\phi_{20}$ is based on the carrier frequency f2 and the distance difference $\Delta r_1$ between distances from the antenna elements $53_1$ and $53_2$ to the target object 61.

For example, suppose that the carrier frequency f2 is 4.8 GHz and the wavelength λ2 is 6.25 cm. Then, the relationship between the second phase difference $\Delta\phi_{20}$ and the distance difference $\Delta r_1$ (path difference) between distances from the antenna elements $53_1$ and $53_2$ to the target object 61 (the target-side antenna 62) is denoted by Equation 6 below. In this case, every time the direction of the target object 61 changes by approximately 12.0 degrees, the second phase difference $\Delta\phi_{20}$ between the first transmission signal $St_1(f2)$ and the second transmission signal $St_2(f2)$ changes by 2π.

$$\Delta\phi_{20} = \frac{2\pi \Delta r_1}{\lambda 2} = \frac{2\pi L_1 \sin\theta}{\lambda 2} = 2\pi \cdot 4.8 \cdot \sin\theta \qquad \text{[Math. 6]}$$

Then in step 31, it is determined whether a predetermined time period has passed since shifting of the phase $\phi_2(f2)$ of the second transmission signal $St_2(f2)$ has been started. If "NO" is determined in step 31, the predetermined time period has not passed. Thus, the process returns to step 31 again, and the process is kept waited until the predetermined time period passes.

On the other hand, if "YES" is determined in step 31, that is, when the predetermined time period has passed, the process proceeds to step 32, in which the information $D\phi$ processed by the signal processing circuit 24 is returned from the target object 61 to the measurement apparatus 52.

In step 33, the measurement apparatus 52 determines the second distance D2 on the basis of a time period from when shifting of the phase $\phi_2(f2)$ of the second transmission signal $St_2(f2)$ is started to when the information $D\phi$ returned from the target object 61 is received by the measurement apparatus 52, as in step 26.

Then in step 34, the direction θ of the target object 61 is identified on the basis of the first phase difference $\Delta\phi_{10}$ determined in step 23 and the second phase difference $\Delta\phi_{20}$ determined in step 30. At that time, the first phase difference $\Delta\phi_{10}$ for the carrier frequency f1 and the second phase difference $\Delta\phi_{20}$ for the carrier frequency f2 have different degrees of change, i.e., 11.5 degrees and 12.0 degrees, for the direction θ of the target object 21. Accordingly, even when the phase difference $\Delta\phi_{10}$ is equal to 2nπ ($\Delta\phi_{10}$=0), the other phase difference $\Delta\phi_{20}$ is not equal to 2nπ. Thus, how many times the phase difference $\Delta\phi_{10}$ has been repeated is successfully determined. That is, the detection circuit 15 of the measurement apparatus 52 successfully detects the direction θ of the target object 61 from the measurement apparatus 52 by detecting the matching direction θ from among the candidate directions θ determined based on the first phase difference $\Delta\phi_{10}$ and the second phase difference $\Delta\phi_{20}$.

Then in step 35, the distance from the measurement apparatus 52 to the target object 61 is determined on the basis of the first distance D1 determined in step 26 and the second distance D2 determined in step 33. The distance from the measurement apparatus 52 to the target object 61 may be determined, for example, by using the average of the first distance D1 and the second distance D2 or by using one of the first distance D1 and the second distance D2.

As described above, advantageous effects substantially the same as those of the first embodiment can be obtained also in the third embodiment. In the third embodiment, the positioning system 51 includes the measurement apparatus 52 including the single antenna pair 53 including the two antenna elements $53_1$ and $53_2$, and the target object 61 including the signal processing circuit 24 that processes the reception signals $Sr_1$ and $Sr_2$. When the transmission signals $St_1(f1)$ and $St_2(f1)$ that have the carrier frequency f1 and whose phase difference $\Delta\phi(f1)$ changes over time are respectively output from the two antenna elements $53_1$ and $53_2$ of the antenna pair 53, such transmission signals cause the reception signal $Sr_1$ received by the target-side antenna 62 to beat. Accordingly, the target object 61 can detect, by using the signal processing circuit 24, the first phase difference $\Delta\phi_{10}$ caused between the target-side antenna 62 and the two antenna elements $53_1$ and $53_2$ on the basis of this beat, and can return, by using the transmission circuit 23C, the information Dφ regarding the first phase difference $\Delta\phi_{10}$ to the measurement apparatus 52. Then, the measurement apparatus 52 can detect the direction θ of the target object 61 on the basis of the information Dφ regarding the first phase difference $\Delta\phi_{10}$.

However, since the first phase difference $\Delta\phi_{10}$ is repeated every time the path difference $\Delta r_1$ between distances of the target-side antenna 62 and the two antenna elements $53_2$ and $53_2$ changes by one wavelength, a plurality of directions θ may be determined on the basis of only the information Dφ regarding the first phase difference $\Delta\phi_{10}$. However, the measurement apparatus 52 transmits the signals from the antenna pair 53 while changing the frequency to two or more kinds of frequencies. Accordingly, the two antenna elements $53_2$ and $53_2$ of the antenna pair 53 are capable of outputting the transmission signals $St_1(f1)$ and $St_2(f1)$ having the carrier frequency f1 and then transmission signals $St_2(f2)$ and $St_2(f2)$ having the carrier frequency f2. Consequently, the different phase differences $\Delta\phi_{10}$ and $\Delta\phi_{20}$ can be detected respectively for the carrier frequencies f1 and f2, and the direction of the target object 61 can be uniquely identified on the basis of the plurality of phase differences $\Delta\phi_{10}$ and $\Delta\phi_{20}$.

In addition, the target object 61 transmits the information Dφ processed by the signal processing circuit 24 to the measurement apparatus 52 with a predetermined delay. Accordingly, the propagation time period taken for the signals to propagate between the measurement apparatus 52 and the target object 61 is successfully determined and the distance from the measurement apparatus 52 to the target object 61 is successfully determined on the basis of this propagation time period, as in the disclosure of the first embodiment.

In addition, since synchronization is not needed for the antenna pair 53, the configuration of the measurement apparatus 52 can be simplified. In addition, since the signals just need to be radiated from the antenna pair 53 while the frequency thereof is been swept, there is no need to install two systems at different positions as in the related art, and consequently the measurement apparatus 52 can be easily installed. In this case, since the measurement apparatus 52 of the positioning system 51 includes the single antenna pair 53 including the two antenna elements $53_1$ and $53_2$, the distance to and the direction θ of the target object 61 can be detected by using a simple configuration.

In the first embodiment, the phase difference $\Delta\phi_1$ between the phases of the second transmission signal $St_{12}$ and the first transmission signal $St_{11}$ continuously changes over time as illustrated in FIG. 6; however, the present disclosure is not limited to this case. The phase difference $\Delta\phi_1$ between the phases of the second transmission signal and the first transmission signal may discretely change over time by a certain value 0 (e.g., φ0=2π/8) in every predetermined time period. This also applies to the second and third embodiments.

In addition, in the first embodiment, the measurement apparatus 2 includes the reception antenna element 13 that receives the return signal Sp from the target object 21; however, the present disclosure is not limited to this configuration. For example, the reception antenna element may be omitted and one antenna element from among the plurality of antenna elements used for transmission may receive the return signal. This also applies to the second and third embodiments.

In addition, in the first embodiment, the target object 21 receives the transmission signals $St_{11}$, $St_{12}$, $St_{21}$, and $St_{22}$ by using the single target-side antenna 22 and returns the information Dφ subjected to signal processing to the measurement apparatus 2 by using the single target-side antenna 22; however, the present disclosure is not limited to this configuration. The target-side antenna may include two antennas, and one of the two antennas may be used for reception and the other may be used for transmission. The same also applies to the second and third embodiments.

In addition, in the first embodiment, the phase difference $\Delta\phi_1$ between that phases the first transmission signal $St_{11}$ and the second transmission signal $St_{12}$ and the phase difference $\Delta\phi_2$ between the first transmission signal $St_{21}$ and the second transmission signal $St_{22}$ are changed little by little to make the first transmission signals $St_{11}$ and $St_{21}$ and the second transmission signals $St_{12}$ and $St_{22}$ differ from each other; however, the present disclosure is not limited to this configuration. The first transmission signal and the second transmission signal may be made to differ from each other by making the frequency of the first transmission signal and the frequency of the second transmission signal slightly differ from each other. In this case, the difference in frequency between the first transmission signal and the second transmission signal produces a frequency of a beat waveform. Thus, the frequency difference is appropriately set by taking into account the period of the beat waveform or the like. The same also applies to the second and third embodiments.

In addition, in the first embodiment, the two antenna pairs 3 and 4 respectively having the space $L_1$ between the antenna elements $3_1$ and $3_2$ and the space $L_2$ between the antenna elements $4_1$ and $4_2$ are used; however, the present disclosure is not limited to this configuration. Three or more antenna pairs may be used. The same also applies to the second embodiment.

In addition, in the third embodiment, the antenna pair 53 outputs the two different kinds of transmission signals $St_1(f1)$, $St_2(f1)$, $St_1(f2)$, and $St_2(f2)$ by using the two kinds of carrier frequencies f1 and f2; however, the present disclosure is not limited to this configuration. Transmission signals may be output from the antenna pair by using three or more kinds of carrier frequencies.

REFERENCE SIGNS LIST 1, 51 positioning system
2, 31, 52 measurement apparatus
3, 32 first antenna pair
$3_1$, 34, $53_1$ first antenna element
$3_2$, 35, $53_2$ second antenna element
4, 33 second antenna pair
$4_1$ first antenna element
$4_2$, 36 second antenna element
5, 37, 54 signal generation circuit
6 oscillator
$8_1$, $8_2$, $11_1$, $11_2$, 39, $57_1$, $57_2$ phase shifter
21, 61 target object
22, 62 target-side antenna
23C transmission circuit
24 signal processing circuit
53 antenna pair
55 voltage-controlled oscillator

The invention claimed is:

1. A positioning system comprising:
an apparatus including a first antenna pair including two antenna elements, a second antenna pair including two antenna elements, and a signal generation circuit that generates transmission signals to be output from the antenna elements, wherein a distance between the two antenna elements of the first antenna pair and a distance between the two antenna elements of the second antenna pair are different from each other, the apparatus is configured to output different transmission signals from the two antenna elements of the first antenna pair and to output different transmission signals different from the two antenna elements of the second antenna pair; and
a target object including a target-side antenna, a signal processing circuit that simultaneously receives from the target-side antenna two transmission signals transmitted from the apparatus and processes a reception signal, and a transmission circuit that returns a processed signal from the target-side antenna to the apparatus,
wherein a distance and a direction of the target object from the apparatus are detected by configuring the first antenna pair and the second antenna pair of the apparatus to operate alternately in time and by configuring the target object to transmit information processed by the signal processing circuit to the apparatus with a predetermined delay.

2. The positioning system according to claim 1, wherein an antenna element of the first antenna pair and an antenna element of the second antenna pair are physically embodied as a single antenna.

3. The positioning system according to claim 1, wherein the signal generation circuit of the apparatus includes an oscillator and a phase shifter.

4. A positioning system comprising:
an apparatus including a pair of antenna elements, and a signal generation circuit that generates transmission signals to be output from the pair of antenna elements, the apparatus being configured to output different transmission signals from each antenna element of the pair of antenna elements; and
a target object including a target-side antenna, a signal processing circuit that simultaneously receives from the target-side antenna two transmission signals transmitted from the apparatus and processes a reception signal, and a transmission circuit that returns a processed signal from the target-side antenna to the apparatus,
wherein a distance and a direction of the target object from the apparatus are detected by configuring the apparatus to output the transmission signals from the pair of antenna elements while sweeping a frequency of the transmission signals and by configuring the target object to transmit information processed by the signal processing circuit to the apparatus with a predetermined delay.

5. The positioning system according to claim 4, wherein the apparatus outputs the transmission signals from the pair of antenna antenna with at least two different carrier frequencies.

6. The positioning system according to claim 4, wherein the signal generation circuit of the apparatus includes a voltage-controlled oscillator.

7. The positioning system according to claim 4, wherein the signal generation circuit of the apparatus includes an oscillator and a phase shifter.

* * * * *

UNITED STATES PATENT AND TRADEMARK OFFICE
CERTIFICATE OF CORRECTION

PATENT NO. : 10,379,216 B2
APPLICATION NO. : 15/280023
DATED : August 13, 2019
INVENTOR(S) : Koichi Takizawa et al.

It is certified that error appears in the above-identified patent and that said Letters Patent is hereby corrected as shown below:

In the Specification

Column 23, Line 51, "$53_2$" should read --$53_1$--

Column 23, Line 58, "$53_2$ and $53_2$" should read --$53_1$ and $53_2$--

Column 23, Line 60, "$St_2(f2)$" should read --$St_1(f2)$--

Column 24, Line 29, "value 0" should read --value $\phi 0$--

Signed and Sealed this
Fifteenth Day of September, 2020

Andrei Iancu
*Director of the United States Patent and Trademark Office*